(12) United States Patent
Nesteroff et al.

(10) Patent No.: US 11,105,338 B2
(45) Date of Patent: *Aug. 31, 2021

(54) IMPELLER SHROUD WITH SLIDABLE COUPLING FOR CLEARANCE CONTROL IN A CENTRIFUGAL COMPRESSOR

(71) Applicants: Rolls-Royce Corporation, Indianapolis, IN (US); Rolls-Royce North American Technologies Inc., Indianapolis, IN (US)

(72) Inventors: Michael Nesteroff, Indianapolis, IN (US); Jonathan Acker, Westfield, IN (US); Jeffrey Crutchfield, Indianapolis, IN (US); Nate Cooper, Avon, IN (US); Mark Whitlock, Zionsville, IN (US); Nathan Ottow, Indianapolis, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,011

(22) Filed: Sep. 23, 2019

(65) Prior Publication Data

US 2021/0062824 A1 Mar. 4, 2021

Related U.S. Application Data

(60) Division of application No. 15/234,601, filed on Aug. 11, 2016, now Pat. No. 10,458,429, which is a (Continued)

(51) Int. Cl.
*F04D 29/42* (2006.01)
*F04D 29/16* (2006.01)
(Continued)

(52) U.S. Cl.
CPC ......... *F04D 29/4206* (2013.01); *F01D 5/048* (2013.01); *F01D 11/22* (2013.01); (Continued)

(58) Field of Classification Search
CPC .......... F01D 11/22; F01D 11/24; F01D 11/20; F01D 11/14; F04D 29/162; F04D 29/622; (Continued)

(56) References Cited

U.S. PATENT DOCUMENTS 3,085,398 A 4/1963 Ingleson
4,264,271 A 4/1981 Libertini
(Continued)

FOREIGN PATENT DOCUMENTS

WO 2014130159 A1 8/2014

*Primary Examiner* — Woody A Lee, Jr.
*Assistant Examiner* — Behnoush Haghighian
(74) *Attorney, Agent, or Firm* — Barnes & Thornburg LLP

(57) ABSTRACT

A system for controlling the clearance distance between an impeller blade tip of a centrifugal compressor and a radially inner surface of an impeller shroud in a turbine engine. The system comprises a high pressure air source, an air piston mounted between an engine casing and the shroud and adapted to receive high pressure air from the high pressure air source, a mounting arm coupling the shroud and air piston, and a slidable coupling adapted to allow axial movement of the shroud and joining the shroud to an axial member.

20 Claims, 16 Drawing Sheets

Related U.S. Application Data continuation-in-part of application No. 15/165,404, filed on May 26, 2016, now Pat. No. 10,352,329, and a continuation-in-part of application No. 15/165,468, filed on May 26, 2016, now Pat. No. 10,309,409, and a continuation-in-part of application No. 15/165,728, filed on May 26, 2016, now Pat. No. 10,408,226.

(51) Int. Cl.

| | | |
|---|---|---|
| F01D 5/04 | (2006.01) | |
| F01D 11/22 | (2006.01) | |
| F04D 17/02 | (2006.01) | |
| F04D 17/10 | (2006.01) | |
| F02C 3/08 | (2006.01) | |
| F04D 27/02 | (2006.01) | |
| F01D 11/08 | (2006.01) | |
| F04D 29/62 | (2006.01) | |
| F01D 11/18 | (2006.01) | |

(52) U.S. Cl.
CPC .............. *F02C 3/08* (2013.01); *F04D 17/025* (2013.01); *F04D 17/10* (2013.01); *F04D 27/0246* (2013.01); *F04D 29/162* (2013.01); F01D 11/08 (2013.01); F01D 11/18 (2013.01); F04D 29/622 (2013.01); F04D 29/624 (2013.01)

(58) Field of Classification Search
CPC .... F04D 29/284; F04D 29/4206; F04D 29/68; F04D 29/681; F04D 27/0246
See application file for complete search history.

(56) References Cited

U.S. PATENT DOCUMENTS

| | | | |
|---|---|---|---|
| 4,419,046 A | | 12/1983 | Carlini |
| 5,017,088 A | * | 5/1991 | Miraucourt ............ F01D 11/22 403/28 |
| 5,263,816 A | | 11/1993 | Weimer et al. |
| 6,273,671 B1 | * | 8/2001 | Ress, Jr. ................ F01D 5/043 415/1 |
| 6,401,460 B1 | | 6/2002 | Xia |
| 6,435,823 B1 | | 8/2002 | Schroder |
| 7,079,957 B2 | | 7/2006 | Finnigan et al. |
| 7,125,223 B2 | | 10/2006 | Turnquist et al. |
| 7,220,097 B2 | | 5/2007 | Boeck |
| 7,326,027 B1 | | 2/2008 | Skoch et al. |
| 7,341,426 B2 | | 3/2008 | Schwarz et al. |
| 7,407,369 B2 | | 8/2008 | Schwarz et al. |
| 7,465,145 B2 | | 12/2008 | Kane |
| 7,491,029 B2 | | 2/2009 | Pezzetti, Jr. et al. |
| 7,654,791 B2 | | 2/2010 | Werner |
| 7,708,518 B2 | | 5/2010 | Chehab |
| 7,824,151 B2 | | 11/2010 | Schwarz et al. |
| 7,874,793 B2 | | 1/2011 | Razzell et al. |
| 8,011,883 B2 | | 9/2011 | Schwarz et al. |
| 8,087,880 B2 | * | 1/2012 | Karafillis ............... F01D 11/22 415/118 |
| 8,105,012 B2 | | 1/2012 | Anema |
| 8,126,628 B2 | | 2/2012 | Hershey et al. |
| 8,186,945 B2 | | 5/2012 | Bhatnagar et al. |
| 8,256,228 B2 | | 9/2012 | O'Leary |
| 8,272,835 B2 | | 9/2012 | Smith |
| 8,296,037 B2 | | 10/2012 | Plunkett et al. |
| 8,534,996 B1 | | 9/2013 | Pankey et al. |
| 8,550,767 B2 | | 10/2013 | Horn et al. |
| 8,555,477 B2 | | 10/2013 | Bates |
| 8,602,724 B2 | | 12/2013 | Takahashi et al. |
| 8,608,427 B2 | | 12/2013 | Bock |
| 8,616,827 B2 | | 12/2013 | O'Leary |
| 8,678,742 B2 | | 3/2014 | Klingels |
| 8,894,358 B2 | | 11/2014 | Bacic |
| 8,939,709 B2 | | 1/2015 | Nanukuttan et al. |
| 8,939,715 B2 | | 1/2015 | Miller |
| 8,944,756 B2 | | 2/2015 | Lagueux |
| 8,961,115 B2 | | 2/2015 | Rhoden et al. |
| 8,998,563 B2 | | 4/2015 | Rioux |
| 9,097,133 B2 | | 8/2015 | Dong et al. |
| 9,121,302 B2 | * | 9/2015 | Duong ................... F01D 11/22 |
| 9,212,667 B2 | | 12/2015 | Sun et al. |
| 9,228,447 B2 | | 1/2016 | McCaffrey |
| 9,260,974 B2 | | 2/2016 | Hasting et al. |
| 9,309,777 B2 | | 4/2016 | Webster et al. |
| 9,316,111 B2 | | 4/2016 | Eleftheriou et al. |
| 9,341,074 B2 | | 5/2016 | Schimmels et al. |
| 9,353,641 B2 | | 5/2016 | Philippot |
| 9,458,855 B2 | | 10/2016 | Dierksmeier et al. |
| 9,476,690 B2 | | 10/2016 | Javelot et al. |
| 9,488,060 B2 | | 11/2016 | Bowman |
| 9,567,865 B2 | | 2/2017 | Jalbert et al. |
| 9,587,507 B2 | * | 3/2017 | Ottow ................... F01D 11/22 |
| 9,598,974 B2 | | 3/2017 | Gekht et al. |
| 9,752,450 B2 | | 9/2017 | Duguay et al. |
| 9,784,117 B2 | | 10/2017 | Duguay et al. |
| 9,840,932 B2 | | 12/2017 | Ballard, Jr. et al. |
| 9,874,105 B2 | | 1/2018 | Callaghan |
| 9,915,163 B2 | | 3/2018 | McCaffrey |
| 9,951,643 B2 | | 4/2018 | Duguay |
| 10,018,067 B2 | | 7/2018 | Klasing et al. |
| 10,053,999 B2 | | 8/2018 | McCaffrey et al. |
| 10,066,497 B2 | | 9/2018 | Duguay |
| 10,087,772 B2 | | 10/2018 | Sun et al. |
| 10,113,556 B2 | | 10/2018 | Moniz et al. |
| 10,138,752 B2 | | 11/2018 | Schilling |
| 10,184,348 B2 | | 1/2019 | Carlucci et al. |
| 10,227,879 B2 | | 3/2019 | Moniz et al. |
| 10,301,961 B2 | | 5/2019 | Davis et al. |
| 10,309,409 B2 | | 6/2019 | Nesteroff et al. |
| 10,309,410 B2 | | 6/2019 | Ottow et al. |
| 10,316,684 B2 | | 6/2019 | Duguay |
| 10,316,685 B2 | | 6/2019 | Davis et al. |
| 10,316,686 B2 | | 6/2019 | Hudson et al. |
| 10,323,536 B2 | | 6/2019 | Hill |
| 10,352,329 B2 | | 7/2019 | Nesteroff et al. |
| 10,364,694 B2 | | 7/2019 | Ribarov et al. |
| 10,364,696 B2 | | 7/2019 | Virkler |
| 10,370,999 B2 | | 8/2019 | Blaney et al. |
| 10,371,050 B2 | | 8/2019 | Iwrey |
| 10,393,149 B2 | | 8/2019 | Mondal et al. |
| 10,400,620 B2 | | 9/2019 | Ribarov et al. |
| 10,408,226 B2 | | 9/2019 | Ottow et al. |
| 10,415,417 B2 | | 9/2019 | McCaffrey |
| 10,415,419 B2 | | 9/2019 | Sun et al. |
| 10,415,421 B2 | | 9/2019 | Arnold et al. |
| 10,428,675 B2 | | 10/2019 | Szarvasy |
| 2008/0134659 A1 | | 6/2008 | Schwarz et al. |
| 2011/0002774 A1 | | 1/2011 | Karafillis et al. |
| 2013/0034425 A1 | | 2/2013 | Biscay et al. |
| 2014/0017600 A1 | | 1/2014 | Brandt et al. |
| 2016/0305269 A1 | | 10/2016 | Blaney et al. |
| 2016/0312644 A1 | | 10/2016 | Blaney et al. |
| 2016/0369644 A1 | | 12/2016 | Blaney et al. |
| 2017/0108004 A1 | | 4/2017 | Schuldt et al. |
| 2017/0175750 A1 | | 6/2017 | McManus |
| 2017/0198709 A1 | * | 7/2017 | Moniz ..................... F02C 9/16 |
| 2017/0234147 A1 | | 8/2017 | Moniz et al. |
| 2017/0306785 A1 | | 10/2017 | Rioux et al. |
| 2017/0342996 A1 | | 11/2017 | Nesteroff et al. |
| 2018/0112550 A1 | | 4/2018 | Dierksmeier et al. |
| 2019/0010822 A1 | | 1/2019 | McCaffrey et al. |
| 2019/0010823 A1 | | 1/2019 | Sun et al. |
| 2019/0078459 A1 | | 3/2019 | Eastwood et al. |
| 2019/0085710 A1 | | 3/2019 | van der Merwe et al. |
| 2019/0128286 A1 | | 5/2019 | Skertic |
| 2019/0195081 A1 | | 6/2019 | Kim |
| 2019/0242303 A1 | | 8/2019 | Menheere et al. |

* cited by examiner

IMPELLER SHROUD WITH SLIDABLE COUPLING FOR CLEARANCE CONTROL IN A CENTRIFUGAL COMPRESSOR

RELATED APPLICATIONS

The present application is a divisional application of and claims priority to U.S. patent application Ser. No. 15/234,601, now U.S. Pat. No. 10,458,429, filed Aug. 11, 2016, which is a continuation in part of and claims priority to U.S. patent application Ser. No. 15/165,404, now U.S. Pat. No. 10,352,329, filed May 26, 2016; U.S. patent application Ser. No. 15/165,468, now U.S. Pat. No. 10,309,409, filed May 26, 2016; and U.S. patent application Ser. No. 15/165,728, now U.S. Pat. No. 10,408,226, filed May 26, 2016, the entirety of which are hereby incorporated by reference.

FIELD OF THE DISCLOSURE

The present invention relates generally to turbine engines having centrifugal compressors and, more specifically, to control of clearances between an impeller and a shroud of a centrifugal compressor.

BACKGROUND

Centrifugal compressors are used in turbine machines such as gas turbine engines to provide high pressure working fluid to a combustor. In some turbine machines, centrifugal compressors are used as the final stage in a multi-stage high-pressure gas generator.

FIG. 1 is a schematic and sectional view of a centrifugal compressor system 100 in a gas turbine engine. One of a plurality of centrifugal compressor blades 112 is illustrated. As blade 112 rotates, it receives working fluid at a first pressure and ejects working fluid at a second pressure which is higher than first pressure. The radially-outward surface of each of the plurality of compressor blades 112 comprises a compressor blade tip 113.

An annular shroud 120 encases the plurality of blades 112 of the impeller. The gap between a radially inner surface 122 of shroud 120 and the impeller blade tips 113 is the blade tip clearance 140 or clearance gap. Shroud 120 may be coupled to a portion of the engine casing 131 directly or via a first mounting flange 133 and second mounting flange 135.

Gas turbine engines having centrifugal compressor systems 100 such as that illustrated in FIG. 1 typically have a blade tip clearance 140 between the blade tips 113 and the shroud 120 set such that a rub between the blade tips 113 and the shroud 120 will not occur at the operating conditions that cause the highest clearance closure. A rub is any impingement of the blade tips 113 on the shroud 120. However, setting the blade tip clearance 140 to avoid blade 112 impingement on the shroud 120 during the highest clearance closure transient may result in a less efficient centrifugal compressor because working fluid is able to flow between the blades 112 and shroud 120 thus bypassing the blades 112 by flowing through gap 140. This working fluid constitutes leakage. In the centrifugal compressor system 100 of FIG. 1, blade tip clearances 140 cannot be adjusted because shroud 120 is rigidly mounted to the engine casing 131.

It is known in the art to dynamically change blade tip clearance 140 to reduce leakage of a working fluid around the blade tips 113. Several actuation systems for adjusting blade tip clearance 140 during engine operation have been developed. These systems often include complicated linkages, contribute significant weight, and/or require a significant amount of power to operate. Thus, there continues to be a demand for advancements in blade clearance technology to minimize blade tip clearance 140 while avoiding rubs.

The present application discloses one or more of the features recited in the appended claims and/or the following features which, alone or in any combination, may comprise patentable subject matter.

SUMMARY

According to an aspect of the present disclosure, a compressor shroud assembly is disclosed in a turbine engine having a dynamically moveable impeller shroud for encasing a rotatable centrifugal compressor and maintaining a clearance gap between the shroud and the rotatable centrifugal compressor. The assembly comprises a static compressor casing; an actuator mounted to the casing; and an impeller shroud slidably coupled at a forward end to the casing and mounted proximate an aft end to the actuator, the impeller shroud moving relative to the rotatable centrifugal compressor in an axial direction while substantially maintaining a radial alignment when the actuator is actuated.

In some embodiments the slidable coupling between the shroud and the casing is dimensioned to maintain an air boundary during the full range of axial movement of the shroud. In some embodiments the assembly further comprises one or more sensors for measuring the clearance gap between the shroud and the rotatable centrifugal compressor, the actuator being actuated or vented in response to the clearance gap measure by the one or more sensors. In some embodiments the assembly further comprises one or more sensors for measuring discharge pressure of the rotatable centrifugal compressor, the actuator being activated in response to the measured pressure.

In some embodiments the actuator is one of a pneumatic, hydraulic, electric, or thermal actuator. In some embodiments the actuator is an air piston comprising a chamber adapted to receive actuating air and an aft extending mounting arm which moves axially substantially maintaining a radial alignment when the piston is actuated. In some embodiments the actuator is a thermal actuator comprising one or more linkage assemblies mounted to the casing and being spaced around the circumference thereof; and an annular thermal driver mounted to the linkage assemblies. In some embodiments the actuator comprises a driving member extending along a radius of and being rotatable about the axis of rotation of the rotatable centrifugal compressor, and a driving mechanism coupled to the driving member to rotate the driving member about the axis of rotation when the actuator is activated.

According to another aspect of the present disclosure, a compressor shroud assembly is disclosed in a turbine engine having an impeller shroud for encasing a rotatable centrifugal compressor and maintaining a clearance gap between the shroud and the rotatable centrifugal compressor. The assembly comprises a static compressor casing; an actuator mounted to the casing; and an impeller shroud comprising a static inducer portion coupled to the casing and a dynamically moveable exducer portion slidably coupled at a forward end to the inducer portion and mounted proximate an aft end to the actuator, the exducer portion moving relative to the rotatable centrifugal compressor in an axial direction while substantially maintaining a radial alignment when the actuator is actuated.

According to yet another aspect of the present disclosure, a method is disclosed of dynamically changing a clearance gap between a rotatable centrifugal compressor and a shroud encasing the rotatable centrifugal compressor. The method comprises mounting an actuator to a static casing; mounting a shroud to the actuator; slidably coupling a forward end of the shroud to the casing; and actuating the actuator to thereby move the shroud relative to a rotatable centrifugal compressor, the shroud moving relative to the rotatable centrifugal compressor in an axial direction while substantially maintaining a radial alignment.

In some embodiments the method further comprises sensing the clearance gap between the rotatable centrifugal compressor and the shroud and actuating the actuator in response to the sensed clearance gap. In some embodiments the method further comprises sensing the discharge pressure of the rotatable centrifugal compressor and actuating the actuator in response to the sensed discharge pressure. In some embodiments the step of actuating the actuator comprises supplying or discharging high pressure air to an air piston to effect axial motion while substantially maintaining a radial alignment of the shroud.

BRIEF DESCRIPTION OF THE DRAWINGS

The following will be apparent from elements of the figures, which are provided for illustrative purposes and are not necessarily to scale.

Figure 1:
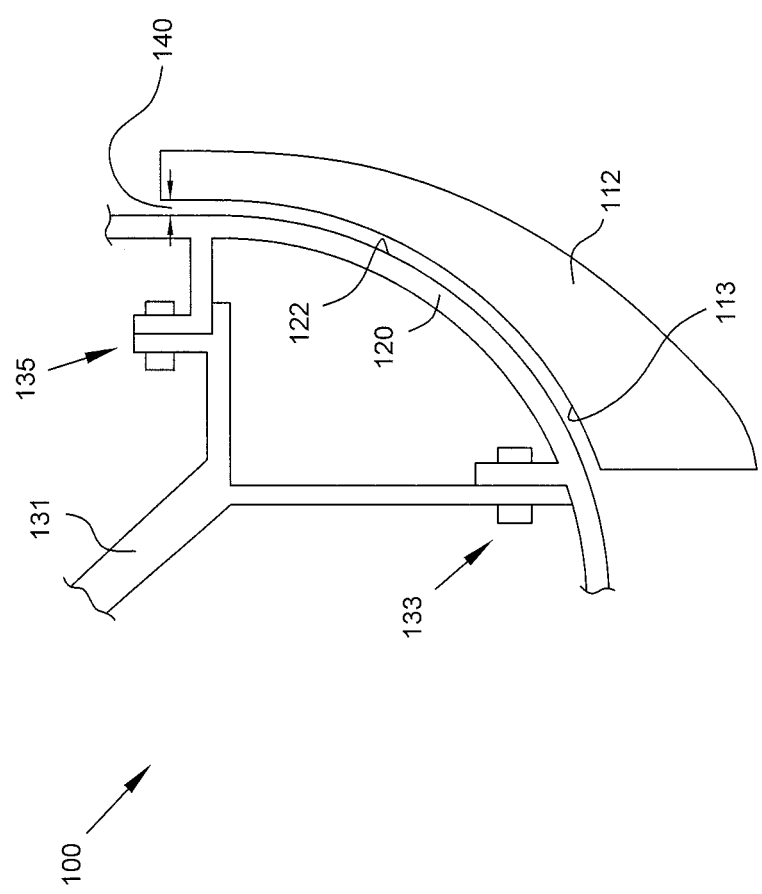
FIG. 1 is a schematic and sectional view of a centrifugal compressor system in a gas turbine engine.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

This disclosure presents embodiments to overcome the aforementioned deficiencies in clearance control systems and methods. More specifically, the present disclosure is directed to a system for clearance control of blade tip clearance which avoids the complicated linkages, significant weight penalties, and/or significant power requirements of prior art systems. The present disclosure is directed to a system which actuates an actuator to cause axial deflection of an impeller shroud. The impeller shroud is slidably coupled, or coupled with a sliding joint, to an engine casing to form a tight clearance joint, thus allowing the impeller shroud to axially deflect as a result of actuating the actuator.

Figure 2A:
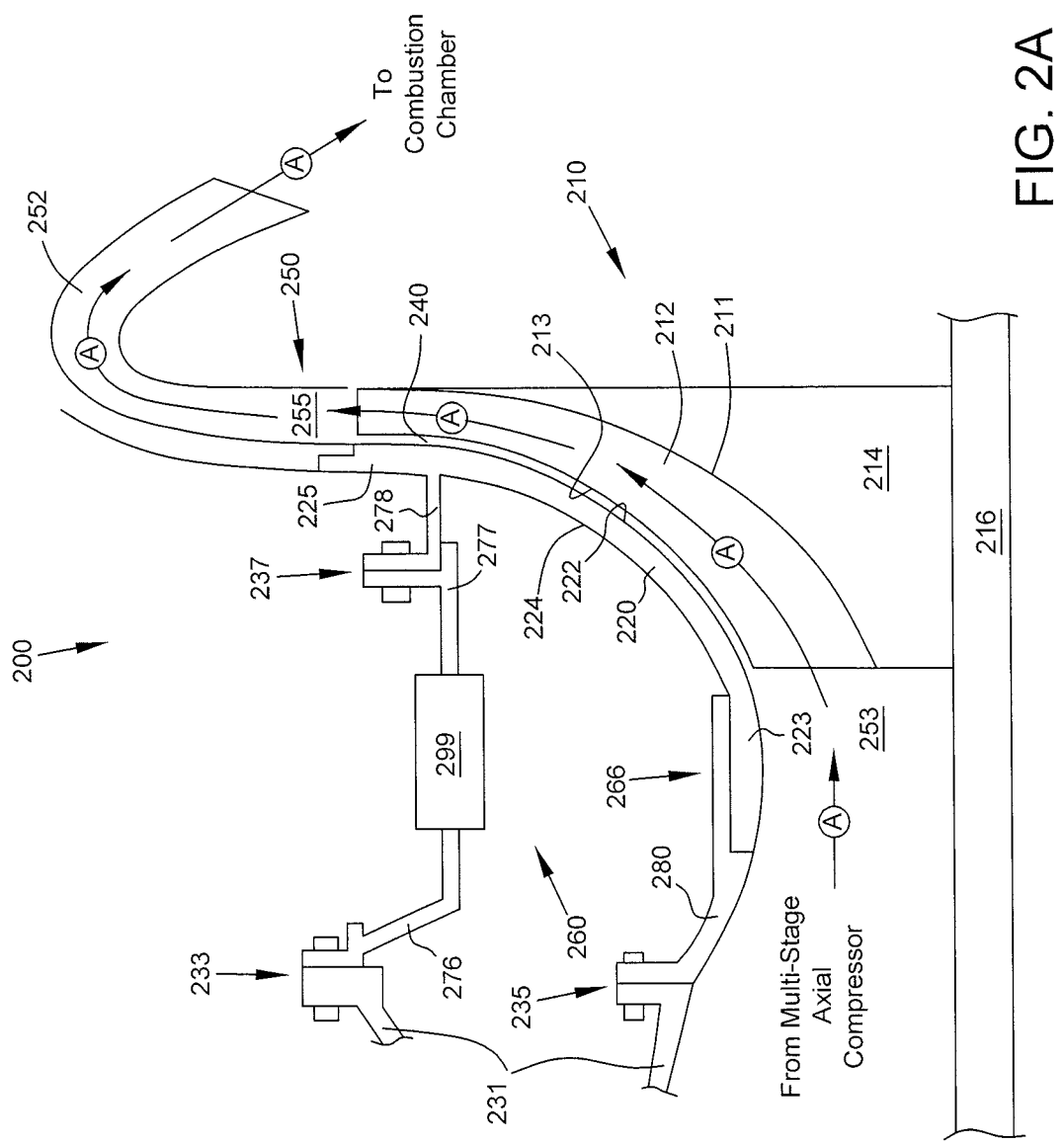
FIG. 2A is a schematic and sectional view of a centrifugal compressor system having a clearance control system in accordance with some embodiments of the present disclosure.

FIG. 2A is a schematic and sectional view of a centrifugal compressor system 200 having a clearance control system 260 in accordance with some embodiments of the present disclosure. Centrifugal compressor system 200 comprises centrifugal compressor 210 and clearance control system 260.

The centrifugal compressor 210 comprises an annular impeller 211 having a plurality of centrifugal compressor blades 212 extending radially from the impeller 211. The impeller 211 is coupled to a disc rotor 214 which is in turn coupled to a shaft 216. Shaft 216 is rotatably supported by at least forward and aft shaft bearings (not shown) and may rotate at high speeds. The radially-outward surface of each of the compressor blades 212 constitutes a compressor blade tip 213.

As blade 212 rotates, it receives working fluid at an inlet pressure and ejects working fluid at a discharge pressure which is higher than the inlet pressure. Working fluid (e.g. air in a gas turbine engine) is typically discharged from a multi-stage axial compressor (not shown) prior to entering the centrifugal compressor 210. Arrows A illustrate the flow of working fluid through the centrifugal compressor 210. Working fluid enters the centrifugal compressor 210 from an axially forward position 253 at an inlet pressure. Working fluid exits the centrifugal compressor 210 at an axially aft and radially outward position 255 at a discharge pressure which is higher than inlet pressure.

Working fluid exiting the centrifugal compressor 210 passes through a diffusing region 250 and then through a deswirl cascade 252 prior to entering a combustion chamber (not shown). In the combustion chamber, the high pressure working fluid is mixed with fuel and ignited, creating combustion gases that flow through a turbine (not shown) for work extraction.

In one embodiment, the clearance control system 260 comprises an actuator 299, an annular shroud 220, and a slidable coupling 266. Clearance control system 260 can also be referred to as a compressor shroud assembly.

Actuator 299 is adapted to cause axial movement of annular shroud 220 while substantially maintaining radial alignment of annular shroud 220. Actuator 299 is coupled between a portion of engine casing 231 and shroud 220. A forward-extending arm 276 extends axially forward from actuator 299 and is coupled to engine casing 231 at first mounting flange 233, thus mounting actuator 299 to the casing 231. An aft-extending arm 277 extends axially aft from actuator 299 and is coupled to a mounting arm 278 extending axially forward from shroud 220. Aft-extending arm 277 and mounting arm 278 are coupled at mounting flange 237.

As discussed below, in some embodiments actuator 299 may comprise a pneumatic piston, a set of thermally-actuated linkages, or a threaded member.

Shroud 220 is a dynamically moveable impeller shroud. Shroud 220 encases the plurality of blades 212 of the centrifugal compressor 210. Shroud 220 comprises a forward end portion 223 terminating at slidable coupling 266, a central portion 224, and a aft end portion 225. In some embodiments, surface 222 of shroud 220 comprises an abradable surface. In some embodiments, a replaceable cover is provided which covers the surface 222 and is replaced during engine maintenance due to impingement of blade tips 213 against surface 222.

In some embodiments aft end portion 225 is defined as the radially outward most third of shroud 220. In other embodiments aft end portion 225 is defined as the radially outward most quarter of shroud 220. In still further embodiments aft end portion 225 is defined as the radially outward most tenth of shroud 220. In embodiments wherein mounting arm 278 extends axially forward from aft end portion 225, these various definitions of aft end portion 225 as either the final third, quarter, or tenth of shroud 220 provide for the various radial placements of mounting arm 278 relative to shroud 220.

Slidable coupling 266 comprises an axial member 280 coupled to forward end portion 223 of shroud 220. Slidable coupling 266 is adapted to allow sliding displacement or translation between axial member 280 and forward end portion 223. In some embodiments one or more surfaces of forward end portion 223 and/or axial member 280 comprise a lubricating surface to reduce friction and wear between these components. In some embodiments the lubricating surface is a coating. In some embodiments slidable coupling 266 is a tight clearance joint between forward end portion 223 and axial member 280. In some embodiments slidable coupling 266 provides a radially centering feature for the shroud 220 relative to the engine casing 231 and to the engine centerline.

Clearance control system 260 is coupled to the engine casing 231 via a first mounting flange 233 and second mounting flange 235. In some embodiments engine casing 231 is at least a portion of a casing around the multi-stage axial compressor.

The gap between a surface 222 of shroud 220 which faces the impeller 211 and the impeller blade tips 213 is the blade tip clearance 240. In operation, thermal, mechanical, and pressure forces act on the various components of the centrifugal compressor system 200 causing variation in the blade tip clearance 240. For most operating conditions, the blade tip clearance 240 is larger than desirable for the most efficient operation of the centrifugal compressor 210. These relatively large clearances 240 avoid rubbing between blade tip 213 and the surface 222 of shroud 220, but also result in high leakage rates of working fluid past the impeller 211. It is therefore desirable to control the blade tip clearance 240 over a wide range of steady state and transient operating conditions. The disclosed clearance control system 260 provides blade tip clearance 240 control by positioning shroud 220 relative to blade tips 213.

Figure 2B:
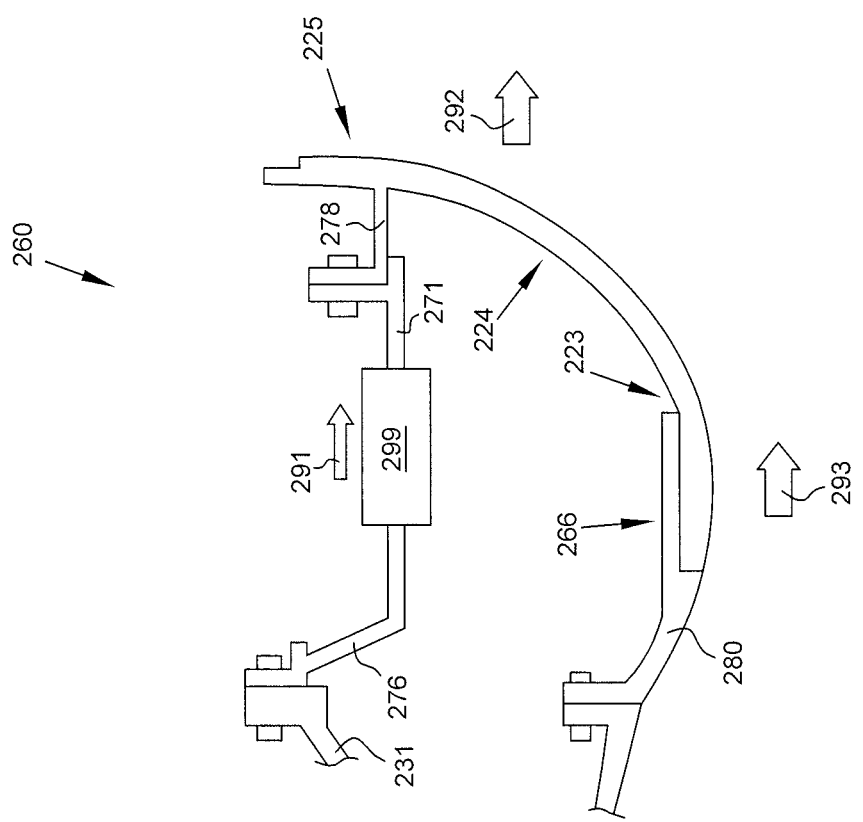
FIG. 2B is an enlarged schematic and sectional view of the clearance control system illustrated in FIG. 2A, in accordance with some embodiments of the present disclosure.

FIG. 2B is an enlarged schematic and sectional view of the clearance control system 260 illustrated in FIG. 2A, in accordance with some embodiments of the present disclosure. The operation of clearance control system 260 will be discussed with reference to FIG. 2B.

In some embodiments during operation of centrifugal compressor 210 blade tip clearance 240 is monitored by periodic or continuous measurement of the distance between surface 222 and blade tips 213 using a sensor or sensors positioned at selected points along the length of surface 222. When clearance 240 is larger than a predetermined threshold, it may be desirable to reduce the clearance 240 to prevent leakage and thus improve centrifugal compressor efficiency. Actuator 299 may be actuated based on measured blade tip clearance 240 to move shroud 220 and thus adjust the blade tip clearance 240 as desired.

In other embodiments, engine testing may be performed to determine blade tip clearance 240 for various operating parameters and actuator 299 schedule is developed for different modes of operation. For example, based on clearance 240 testing, actuator 299 may actuate a predetermined degree for cold engine start-up, warm engine start-up, steady state operation, and max power operation conditions. As another example, a table may be created based on blade tip clearance 240 testing, and actuator 299 actuation is adjusted according to operating temperatures and pressures of the centrifugal compressor 210. A sensor may be used to monitor the degree of actuation of actuator 299. Thus, based on monitoring the operating conditions of the centrifugal compressor 210 such as inlet pressure, discharge pressure, and/or working fluid temperature, a desired blade tip clearance 240 is achieved according to a predetermined schedule of actuation for actuator 299.

Regardless of whether clearance 240 is actively monitored or controlled via a schedule, in some operating conditions it may be desirable to reduce the clearance in order to reduce leakage past the centrifugal compressor 210. In order to reduce the clearance 240, actuator 299 is actuated to cause movement in an axial direction. With actuator 299 rigidly coupled, or "grounded", to casing 231 via forward-extending arm 276, actuation is enabled in the axially aft direction as indicated by arrow 291 in FIG. 2B.

The axially aft motion displaces aft-extending arm 277 and mounting arm 278. Mounting arm 278 is coupled to and imparts a force on the aft end portion 225 of shroud 220, thus moving the aft end portion 225 in an axially aft direction as indicated by arrow 292. This movement of aft end portion 225 is translated to a similar axially aft movement at the slidable coupling 266, where forward end portion 223 is displaced in an axially aft direction relative to axial member 280 as indicated by arrow 293. Shroud 220 thus moves relative to the centrifugal compressor 210 in an axial direction while substantially maintaining the radial alignment of shroud 220.

The axially aft movement of shroud 220 caused by actuator 299 actuation results in shroud 220 moving closer to blade tips 213, thus reducing the clearance 240 and leakage. During many operating conditions this deflection of shroud 220 in the direction of blade tips 213 is desirable to reduce leakage and increase compressor efficiency.

Where monitoring of blade tip clearance 240 indicates the need for an increase in the clearance 240, actuator 299 is actuated to cause axially forward movement of aft-extending arm 277, mounting arm 278, and aft end portion 225. The axially forward movement of aft end portion 225 results in similar movement of shroud 220, including the sliding displacement in an axially forward direction of forward end portion 223 against axial member 280. Thus, by actuating the actuator 299, shroud 220 is moved axially forward, away from blade tips 213 and increasing blade tip clearance 240.

Slidable coupling 266 is dimensioned such that an air boundary is maintained through the full range of axial movement of shroud 220.

Figure 3A:
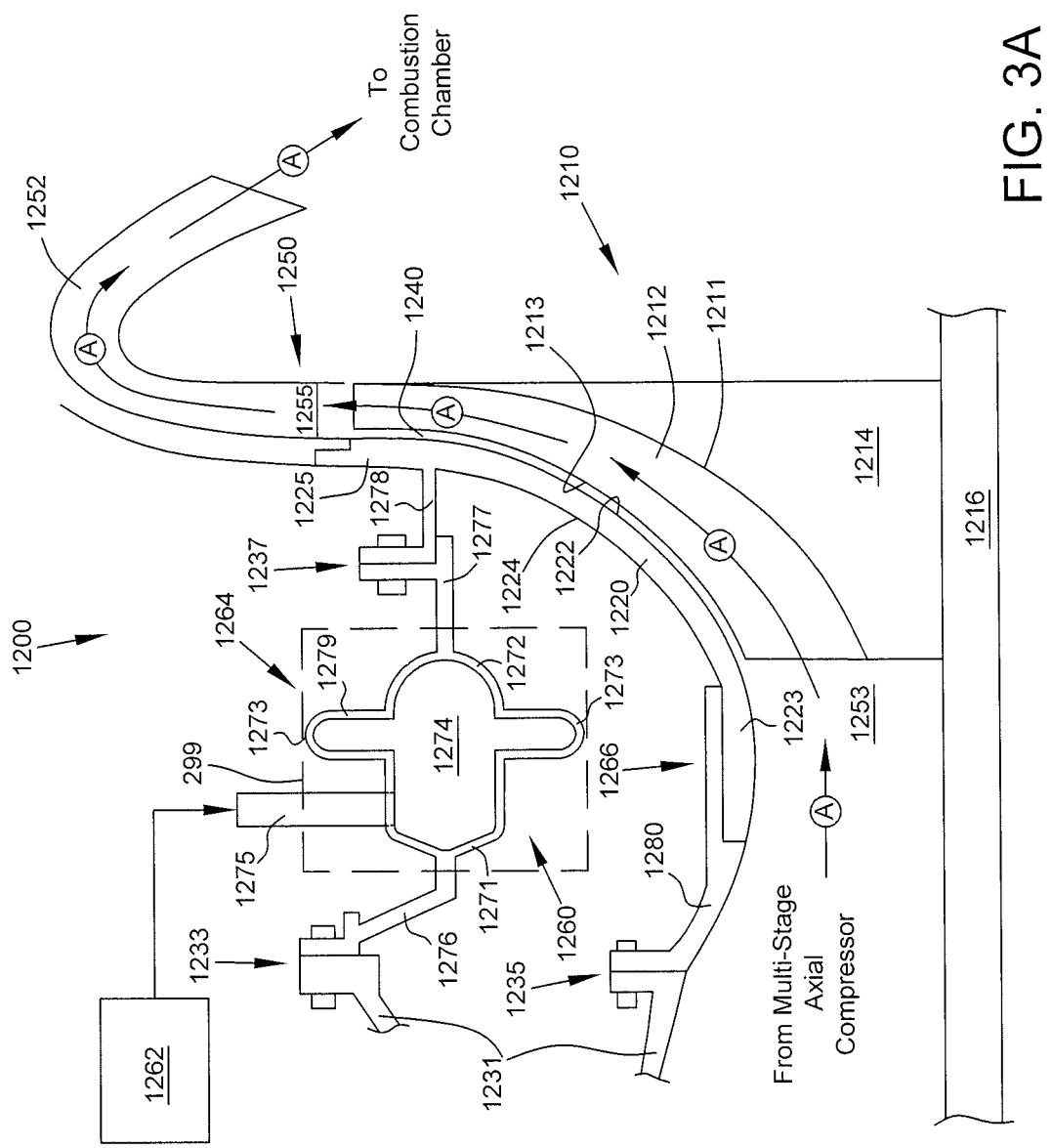
FIG. 3A is a schematic and sectional view of a centrifugal compressor system having a clearance control system with an air piston in accordance with some embodiments of the present disclosure.

FIG. 3A is a schematic and sectional view of a centrifugal compressor system 1200 having a clearance control system 1260 in accordance with some embodiments of the present disclosure. Centrifugal compressor system 1200 comprises centrifugal compressor 1210 and clearance control system 1260.

The centrifugal compressor 1210 comprises an annular impeller 1211 having a plurality of centrifugal compressor blades 1212 extending radially from the impeller 1211. The impeller 1211 is coupled to a disc rotor 1214 which is in turn coupled to a shaft 1216. Shaft 1216 is rotatably supported by at least forward and aft shaft bearings (not shown) and may rotate at high speeds. The radially-outward surface of each of the compressor blades 1212 constitutes a compressor blade tip 1213.

As blade 1212 rotates, it receives working fluid at an inlet pressure and ejects working fluid at a discharge pressure which is higher than the inlet pressure. Working fluid (e.g. air in a gas turbine engine) is typically discharged from a multi-stage axial compressor (not shown) prior to entering the centrifugal compressor 1210. Arrows A illustrate the flow of working fluid through the centrifugal compressor 1210. Working fluid enters the centrifugal compressor 1210 from an axially forward position 1253 at an inlet pressure. Working fluid exits the centrifugal compressor 1210 at an axially aft and radially outward position 1255 at a discharge pressure which is higher than inlet pressure.

Working fluid exiting the centrifugal compressor 1210 passes through a diffusing region 1250 and then through a deswirl cascade 1252 prior to entering a combustion chamber (not shown). In the combustion chamber, the high pressure working fluid is mixed with fuel and ignited, creating combustion gases that flow through a turbine (not shown) for work extraction.

In one embodiment, the clearance control system 1260 comprises an actuator 299, an annular shroud 1220, and a slidable coupling 1266. Clearance control system 1260 can also be referred to as a compressor shroud assembly. In some embodiments, actuator 299 may comprise high pressure air source 1262 and an air piston 1264.

High pressure air source 1262 provides high pressure actuating air to air piston 1264. In some embodiments high pressure air source 1262 is supplied from centrifugal compressor discharge air.

Air piston 1264 is adapted to receive high pressure air from high pressure air source 1262. Air piston 1264 comprises a forward rigid member 1271, aft rigid member 1272, and a central flex member 1273 disposed between forward rigid member 1271 and aft rigid member 1272. Together, forward rigid member 1271, aft rigid member 1272, and central flex member 1273 define a piston chamber 1274. Air piston 1264 is adapted to provide desired deflection to shroud 1220. The degree of deflection provided by air piston 1264 can be manipulated based on alterations to air piston 1264 geometry, such as, for example: altering the thickness of the material comprising the forward rigid member 1271, aft rigid member 1272, and central flex member 1273; altering the radius of the chamber 1274; altering the ear length of the central flex member 1273; and/or altering the centerline of the air piston 1264.

Figure 3B:
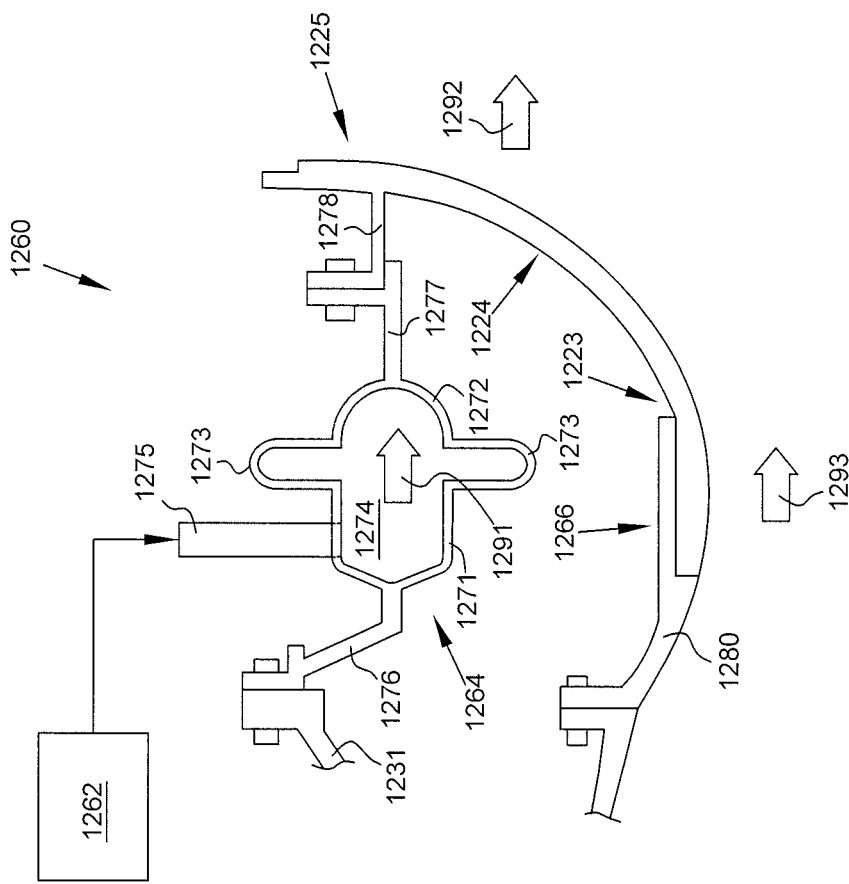
FIG. 3B is an enlarged schematic and sectional view of the clearance control system with an air piston illustrated in FIG. 3A, in accordance with some embodiments of the present disclosure.

In some embodiments, as illustrated in FIGS. 3A and 3B, central flex member 1273 comprises a ring 1279 or hoop having a U-shaped cross section which extends radially outward from forward rigid member 1271 and aft rigid member 1272 and adapted to expand, contract, or flex primarily in an axial direction. In other words, expansion and contraction of air piston 1264 results in axial movement while substantially maintaining a radial alignment.

In some embodiments high pressure air is received from high pressure air source 1262 via a receiving chamber 1275 which is in fluid communication with piston chamber 1274. In some embodiments receiving chamber 1275 includes a regulating valve which regulates movement of high pressure air into and out of piston chamber 1274. In some embodiments receiving chamber 1275 further includes a member for venting piston chamber 1274 to atmospheric pressure or to a pressure which is lower than that of piston chamber 1274.

Air piston 1264 is axially disposed between a portion of engine casing 1231 and shroud 1220. A forward-extending arm 1276 extends axially forward from forward rigid portion 1271 and is coupled to engine casing 1231 at first mounting flange 1233, thus mounting air piston 1264 to the casing 1231. An aft-extending arm 1277 extends axially aft from aft rigid portion 1272 and is coupled to a mounting arm 1278 extending axially forward from shroud 1220. Aft-extending arm 1277 and mounting arm 1278 are coupled at mounting flange 1237.

In some embodiments air piston 1264 is an annular piston. In other embodiments, a plurality of discrete air pistons 1264 are circumferentially disposed about shroud 1220 and each act independently upon the shroud 1220.

Shroud 1220 is a dynamically moveable impeller shroud. Shroud 1220 encases the plurality of blades 1212 of the centrifugal compressor 1210. Shroud 1220 comprises a forward end portion 1233 terminating at slidable coupling 1266, a central portion 1224, and a aft end portion 1225. In some embodiments, surface 1222 of shroud 1220 comprises an abradable surface. In some embodiments, a replaceable cover is provided which covers the surface 1222 and is replaced during engine maintenance due to impingement of blade tips 1213 against surface 1222.

In some embodiments aft end portion 1225 is defined as the radially outward most third of shroud 1220. In other embodiments aft end portion 1225 is defined as the radially outward most quarter of shroud 1220. In still further embodiments aft end portion 1225 is defined as the radially outward most tenth of shroud 1220. In embodiments wherein mounting arm 1278 extends axially forward from aft end portion 1225, these various definitions of aft end portion 1225 as either the final third, quarter, or tenth of shroud 1220 provide for the various radial placements of mounting arm 1278 relative to shroud 1220.

Slidable coupling 1266 comprises an axial member 1280 coupled to forward end portion 1233 of shroud 1220. Slidable coupling 1266 is adapted to allow sliding displacement between axial member 1280 and forward end portion 1233. In some embodiments one or more surfaces of forward end portion 1233 and/or axial member 1280 comprise a lubricating surface to reduce friction and wear between these components. In some embodiments the lubricating surface is a coating.

Clearance control system 1260 is coupled to the engine casing 1231 via a first mounting flange 1233 and second mounting flange 1235. In some embodiments engine casing 1231 is at least a portion of a casing around the multi-stage axial compressor.

The gap between a surface 1222 of shroud 1220 which faces the impeller 1211 and the impeller blade tips 1213 is the blade tip clearance 1240. In operation, thermal, mechanical, and pressure forces act on the various components of the centrifugal compressor system 1200 causing variation in the blade tip clearance 1240. For most operating conditions, the blade tip clearance 1240 is larger than desirable for the most efficient operation of the centrifugal compressor 1210. These relatively large clearances 1240 avoid rubbing between blade tip 1213 and the surface 1222 of shroud 1220, but also result in high leakage rates of working fluid past the impeller 1211. It is therefore desirable to control the blade tip clearance 1240 over a wide range of steady state and transient operating conditions. The disclosed clearance control system 1260 provides blade tip clearance 1240 control by positioning shroud 1220 relative to blade tips 1213.

Figure 5:
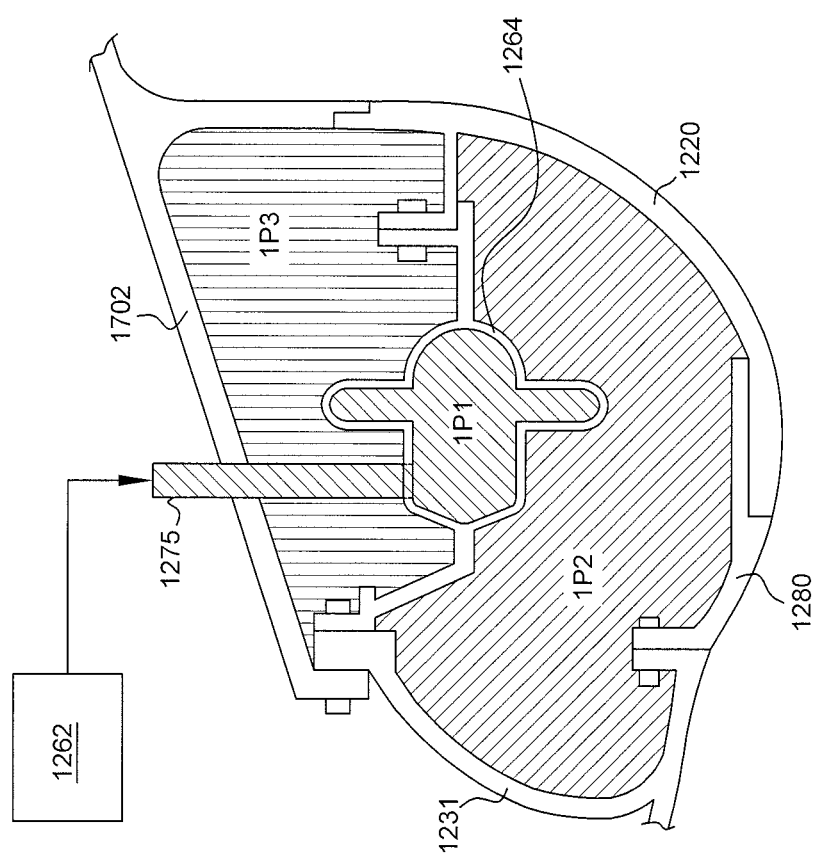
FIG. 5 is a schematic and sectional view of the pressure regions of a clearance control system with an air piston in accordance with some embodiments of the present disclosure.

FIG. 5 is a schematic and sectional view of the pressure regions 1P1, 1P2, and 1P3 of a clearance control system 1260 in accordance with some embodiments of the present disclosure. A first pressure region 1P1 is defined as piston chamber 1274 and receiving member 1275. A second pressure region 1P2 is disposed radially inward from air piston 1264 and radially outward from shroud 1220 and axial member 1280. A third pressure region 1P3 is disposed radially outward from air piston 1264 and radially inward from a casing arm 1702.

In some embodiments, second pressure region 1P2 and third pressure region 1P3 are maintained at or near atmospheric pressure, meaning that regions 1P2 and 1P3 are neither sealed nor pressurized. First pressure region 1P1 receives high pressure air from high pressure air source 262, which in some embodiments is compressor discharge air. However, in such an embodiment, a relatively large piston chamber 1274 is required to overcome the large differential pressure across the shroud 1220 (i.e. differential pressure between the pressure of regions 1P2 and 1P3 and the pressure of the centrifugal compressor 1210. In other words, the large differential pressure makes it more difficult to deflect or cause axial movement in shroud 1220, thus requiring a larger air piston 1264 to perform the work.

Thus in other embodiments second pressure region 1P2 and third pressure region 1P3 are sealed and pressurized to reduce the differential pressure across the shroud 1220. For example, in some embodiments second pressure region 1P2 and third pressure region 1P3 are pressurized using one of inducer air, exducer air, or intermediate stage compressor air. Supplying compressor discharge air to piston chamber 1274 still creates a differential pressure across the air piston 1264 that causes axial deflection, but the force required to move shroud 1220 is greatly reduced due to the lower differential pressure across the shroud 1220.

In embodiments with second pressure region 1P2 sealed and pressurized using inducer air and third pressure region 1P3 sealed and pressurized using exducer air, the selection of the location of mounting arm 1278 between forward end 1233 and aft end 1225 is significant because a greater exposure of shroud 1220 to exducer pressure results in less work required by the air piston 1264 to move shroud 1220. In addition, it can be undesirable to locate mounting arm 1278 adjacent to aft end 1225 due to the risk that the air piston 1264 will overly bend the upper tip of shroud 1220.

In some embodiments second pressure region 1P2 and third pressure region 1P3 are merged as a single, sealed pressure region and are thus pressurized at equal pressures.

FIG. 3B is an enlarged schematic and sectional view of the clearance control system 1260 illustrated in FIG. 3A, in accordance with some embodiments of the present disclosure. The operation of clearance control system 1260 will be discussed with reference to FIG. 3B.

In some embodiments during operation of centrifugal compressor 1210 blade tip clearance 1240 is monitored by periodic or continuous measurement of the distance between surface 1222 and blade tips 1213 using a sensor or sensors positioned at selected points along the length of surface 1222. When clearance 1240 is larger than a predetermined threshold, it may be desirable to reduce the clearance 1240 to prevent leakage and thus improve centrifugal compressor efficiency. Pressure inside the piston chamber 1274 may be adjusted based on measured blade tip clearance 1240 to move shroud 1220 and thus adjust the blade tip clearance 1240 as desired.

In other embodiments, engine testing may be performed to determine blade tip clearance 1240 for various operating parameters and a piston chamber 1274 pressure schedule is developed for different modes of operation. For example, based on clearance 1240 testing, piston chamber 1274 pressures may be predetermined for cold engine start-up, warm engine start-up, steady state operation, and max power operation conditions. As another example, a table may be created based on blade tip clearance 1240 testing, and piston chamber 1274 pressure is adjusted according to operating temperatures and pressures of the centrifugal compressor 1210. A sensor may be used to monitor pressure in piston chamber 1274. Thus, based on monitoring the operating conditions of the centrifugal compressor 1210 such as inlet pressure, discharge pressure, and/or working fluid temperature, a desired blade tip clearance 1240 is achieved according to a predetermined schedule of pressures for piston chamber 1274.

Regardless of whether clearance 1240 is actively monitored or controlled via a schedule, in some operating conditions it may be desirable to reduce the clearance in order to reduce leakage past the centrifugal compressor 1210. In order to reduce the clearance 1240, high pressure gas is supplied by high pressure gas source 1262 to piston chamber 1274. Piston chamber 1274 expands between forward rigid member 1271 and aft rigid member 1272 due to the admission of high pressure gas. Central flex member 1273 enables this expansion in an axial direction. With air piston 1264 rigidly coupled, or "grounded", to casing 1231 via forward-extending arm 1276, expansion of the air piston 1264 is enabled in the axially aft direction as indicated by arrow 291 in FIG. 3B.

The axially aft expansion of air piston 1264 displaces aft-extending arm 1277 and mounting arm 1278. Mounting arm 1278 is coupled to and imparts a force on the aft end portion 1225 of shroud 1220, thus moving the aft end portion 1225 in an axially aft direction as indicated by arrow 1292. This movement of aft end portion 1225 is translated to a similar axially aft movement at the slidable coupling 1266, where forward end portion 1233 is displaced in an axially aft direction relative to axial member 1280 as indicated by arrow 1293. Additionally, as discussed with reference to FIG. 5, the application of air pressure at third pressure region 1P3 imparts a force on aft end portion 1225. Shroud 1220 thus moves relative to the centrifugal compressor 1210 in an axial direction while substantially maintaining the radial alignment of shroud 1220.

The axially aft movement of shroud 1220 caused by air piston 1264 expansion results in shroud 1220 moving closer to blade tips 1213, thus reducing the clearance 1240 and leakage. During many operating conditions this deflection of shroud 1220 in the direction of blade tips 1213 is desirable to reduce leakage and increase compressor efficiency.

Where monitoring of blade tip clearance 1240 indicates the need for an increase in the clearance 1240, high pressure air is bled from piston chamber 1274. As piston chamber 1274 contracts, central flex member 1273 enables the contraction to be primarily in the axial direction, resulting in axially forward movement of aft-extending arm 1277, mounting arm 1278, and aft end portion 1225. The axially forward movement of aft end portion 1225 results in similar movement of shroud 1220, including the sliding displacement in an axially forward direction of forward end portion 1233 against axial member 1280. Thus, by bleeding air from piston chamber 1274 shroud 1220 is moved axially forward, away from blade tips 1213 and increasing blade tip clearance 1240. Slidable coupling 1266 is dimensioned such that an air boundary is maintained through the full range of axial movement of shroud 1220.

Figure 4:
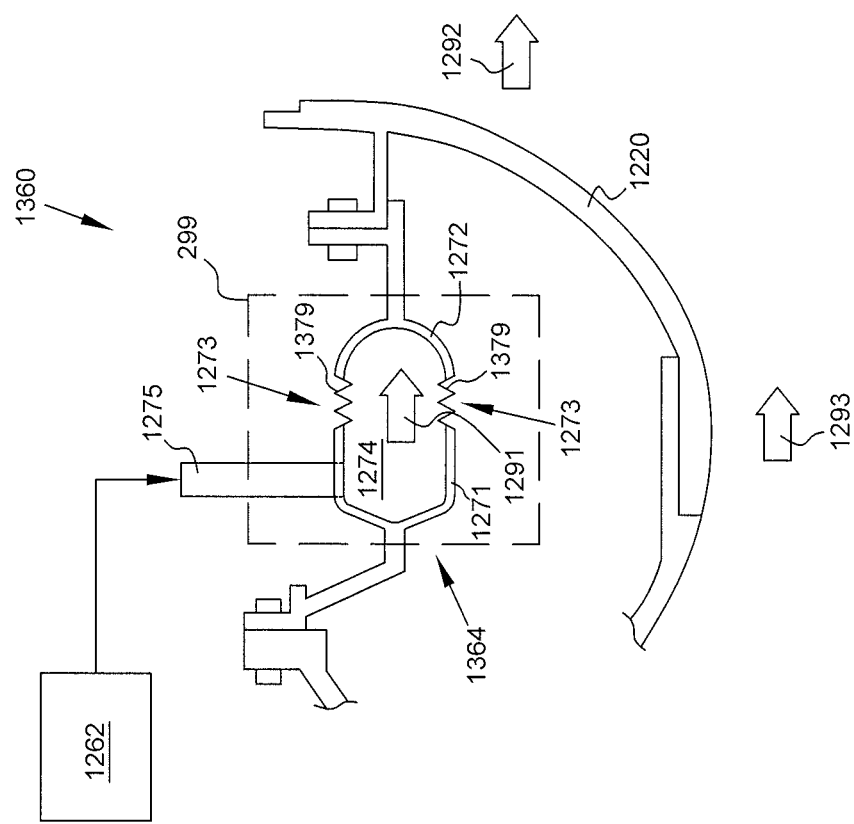
FIG. 4 is a schematic and sectional view of a clearance control system with a bellows-type air piston in accordance with the present disclosure.

FIG. 4 is a schematic and sectional view of another embodiment of a clearance control system 1360 with a bellows-type air piston 1364 in accordance with the present disclosure. Air piston 1364 comprises a bellows 1379 as central flex member 1273 forming a hoop disposed between forward rigid member 1271 and aft rigid member 1272. Like flexible protrusion 1279, bellows 1379 is adapted to expand, contract, or flex primarily in an axial direction. The operation of clearance control system 1360 is substantially the same as the operation of clearance control system 1260 as described above. Bellows 1379 is interchangeable with flexible protrusion 1279, and central flex member 1273 can take many forms.

Figure 6A:
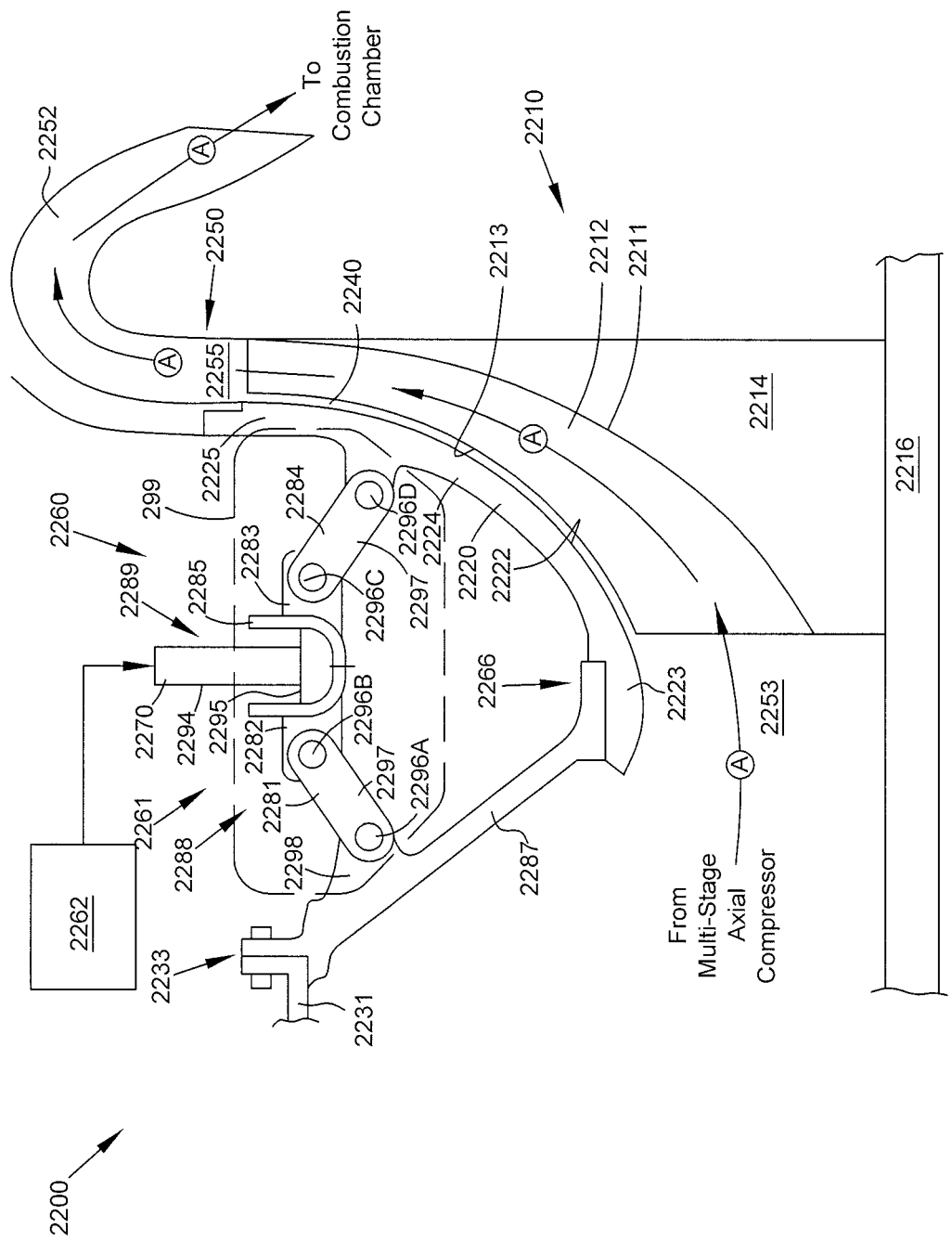
FIG. 6A is a schematic and sectional view of a centrifugal compressor system having a clearance control system in accordance with some embodiments of the present disclosure.

FIG. 6A is a schematic and sectional view of a centrifugal compressor system 2200 having a clearance control system 2260 in accordance with some embodiments of the present disclosure. Centrifugal compressor system 2200 comprises centrifugal compressor 2210 and clearance control system 2260.

The centrifugal compressor 2210 comprises an annular impeller 2211 having a plurality of centrifugal compressor blades 2212 extending radially from the impeller 2211. The impeller 2211 is coupled to a disc rotor 2214 which is in turn coupled to a shaft 2216. Shaft 2216 is rotatably supported by at least forward and aft shaft bearings (not shown) and may rotate at high speeds. The radially-outward surface of each of the compressor blades 2212 constitutes a compressor blade tip 2213.

As blade 2212 rotates, it receives working fluid at an inlet pressure and ejects working fluid at a discharge pressure which is higher than the inlet pressure. Working fluid (e.g. air in a gas turbine engine) is typically discharged from a multi-stage axial compressor (not shown) prior to entering the centrifugal compressor 2210. Arrows A illustrate the flow of working fluid through the centrifugal compressor 2210. Working fluid enters the centrifugal compressor 2210 from an axially forward position 2253 at an inlet pressure. Working fluid exits the centrifugal compressor 2210 at an axially aft and radially outward position 2255 at a discharge pressure which is higher than inlet pressure.

Working fluid exiting the centrifugal compressor 2210 passes through a diffusing region 2250 and then through a deswirl cascade 2252 prior to entering a combustion chamber (not shown). In the combustion chamber, the high pressure working fluid is mixed with fuel and ignited, creating combustion gases that flow through a turbine (not shown) for work extraction.

In one embodiment, the clearance control system 2260 comprises an actuator 299 and an annular shroud 2220. Clearance control system 2260 can also be referred to as a compressor shroud assembly. In some embodiments, actuator 299 may comprise an air source 2262, a thermal driver 2289, and at least one linkage assembly 2288.

Air source 2262 provides air to thermal driver cavity 2286. In some embodiments air source 2262 receives air from more than one location and uses a multi-source regulator valve or mixing valve to send air of an appropriate temperature to thermal driver cavity 2286. For example, in some embodiments air source 2262 receives relatively cool air from earlier compressor stages and relatively warm air from the discharge of centrifugal compressor 2210. When cooling air is desired to be applied to thermal driver cavity 2286, as explained below, air source 2262 sends the relatively cool air received from earlier compressor stages. When heating air is desired to be applied to thermal driver cavity 2286, as explained below, air source 2262 sends the relatively warm air received from centrifugal compressor 2210 discharge.

Potential sources of cooling air include ambient air, low pressure compressor discharge air, inter-stage compressor air, and cooling coil or heat exchanger air. Potential sources of warming air include discharge air of the centrifugal compressor 2210, core engine air, inter-stage turbine air, cooling coil or heat exchanger air, electrically-powered heating coil air, and engine exhaust. In some embodiments warming and/or cooling air flow is replaced by fluid flow such as the flow of a lubricating fluid to provide an actuating temperature to thermal driver 2289.

In some embodiments air source 2262 receives air from multiple sources and mixes them to achieve a desired temperature prior to applying the air to thermal driver cavity 2286.

Thermal driver 2289 comprises an annular ring 2285 and annular seal 2295 which together define thermal driver cavity 2286. In some embodiments thermal driver 2289 further comprises a thermal feed air tube 2294. Annular ring 2285 is formed from a thermally-responsive material such that excitement by application of relatively cool or relatively warm air causes contraction or expansion, respectively. In other words, thermal driver 2289 radially expands or contracts when exposed to an actuating temperature. In some embodiments, annular ring 2285 has a U-shaped radial cross section. In some embodiments, annular ring 2285 and annular seal 2295 comprise a single annular tube, having one or more thermal feed air tubes 2294 coupled thereto.

Annular seal 2295 is coupled to annular ring 2285 to form an annular thermal driver cavity 2286. This cavity 2286 is in fluid communication with the interior 2270 of at least one thermal feed air tube 2294. In some embodiments, more than one thermal feed air tube 2294 are disposed circumferentially around the annular ring 2285 and fluidly communicate with the annular thermal driver cavity 2286. In some embodiments one or more sensors may be disposed in or in fluid communication with cavity 2286 to measure the fluid temperature or fluid pressure of cavity 2286. Thermal driver 2289 may be exposed to warmer or cooler actuating temperatures based on the measured fluid temperature or fluid pressure of cavity 2286.

Linkage assembly 2288 comprises a forward linkage 2281, forward translator 2282, aft translator 2283, and aft linkage 2284. Forward linkage 2281 and forward translator 2282 are coupled between a forward casing member 2287 and thermal driver 2289. Forward linkage 2281 is pivotally mounted to the forward casing member 2287. Aft translator 2283 and aft linkage 2284 are coupled between thermal driver 2289 and shroud 2220. Aft linkage 2284 is pivotally mounted to the shroud 2220. In some embodiments, a central linkage comprises forward translator 2282, aft translator 2283, and thermal driver 2289. In some embodiments, more or fewer linkages are used in linkage assembly 2288.

Each of forward linkage 2281 and aft linkage 2284 comprise a pair of pins 2296 and a linkage member 2297. Each pin 2296 passes through both the respective linkage member 2297 and respective component which is being coupled to the linkage member 2297. For example, pin 2296A passes through the linkage member 2297 of forward linkage 2281 and through an axial extension 2298 of forward casing member 2287, thus forming a pin joint or hinge between forward casing member 2287 and forward linkage 2281. Similar pin joints are formed between forward linkage 2281 and forward translator 2282 (by pin 2296B), between aft translator 2283 and aft linkage 2284 (by pin 2296C), and between aft linkage 2284 and an axial protrusion 2300 from shroud 2220.

Forward translator 2282 and aft translator 2283 are coupled to annular ring 2285 of the thermal driver 2289. Thus, the thermal contraction and expansion of annular ring 2285, caused by the application of relatively cool or relatively warm air to the thermal driver cavity 2286, causes relative motion of forward translator 2282 and aft translator 2283. Linkage assembly 2288 is configured to provide axial movement to shroud 2220 based on the thermal expansion and contraction of the thermal driver 2289, while providing little to no radial or circumferential movement to shroud 2220.

Forward casing arm 2287 is coupled to a portion of engine casing 2231 at first mounting flange 2233. In some embodiments, the portion of engine casing 2231 is the compressor casing of a multi-stage axial compressor disposed forward of centrifugal compressor 2210.

In some embodiments linkage assembly 2288 is annular. In other embodiments, a plurality of discrete linkage assemblies 2288 are circumferentially disposed about shroud 2220 and each act independently upon the shroud 2220.

In some embodiments, a thermal actuator 2261 comprises an annular ring 2285 and annular seal 2295 which together define thermal driver cavity 2286 and at least one linkage assembly 2288. In some embodiments thermal actuator 2261 may further comprise at least one thermal feed air tube 2294. In some embodiments, at least three linkage assemblies 2288 may be spaced around the circumference of shroud 2220. In some embodiments, at least three linkage assemblies 2288 may be spaced around the circumference of casing 2231.

Shroud 2220 is a dynamically moveable impeller shroud. Shroud 2220 encases the plurality of blades 2212 of the centrifugal compressor 2210. Shroud 2220 comprises a forward end portion 2223 terminating at sliding joint 2266, a central portion 224, and a aft end portion 2225.

In some embodiments aft end portion 2225 is defined as the radially outward most third of shroud 2220. In other embodiments aft end portion 2225 is defined as the radially outward most quarter of shroud 2220. In still further embodiments aft end portion 2225 is defined as the radially outward most tenth of shroud 2220. In embodiments wherein axial protrusion 2300 extends axially forward from aft end portion 2225, these various definitions of aft end portion 2225 as either the final third, quarter, or tenth of shroud 2220 provide for the various radial placements of axial protrusion 2300 relative to shroud 2220.

Sliding joint 2266 comprises forward casing arm 2287 coupled to forward end portion 2223 of shroud 2220. Sliding joint 2266 is adapted to allow sliding displacement between casing arm 2287 and forward end portion 2223. In some embodiments one or more surfaces of forward end portion 2223 and/or casing arm 2287 comprise a lubricating surface to encourage sliding displacement between these components. In some embodiments the lubricating surface is a coating.

The gap between a surface 2222 of shroud 2220 which faces the impeller 2211 and the impeller blade tips 2213 is the blade tip clearance 2240. In operation, thermal, mechanical, and pressure forces act on the various components of the centrifugal compressor system 2200 causing variation in the blade tip clearance 2240. For most operating conditions, the blade tip clearance 2240 is larger than desirable for the most efficient operation of the centrifugal compressor 2210. These relatively large clearances 2240 avoid rubbing between blade 2212 and the surface 222 of shroud 2220, but also result in high leakage rates of working fluid past the impeller 2211. It is therefore desirable to control the blade tip clearance 2240 over a wide range of steady state and transient operating conditions. The disclosed clearance control system 2260 provides blade tip clearance 2240 control by positioning shroud 2220 relative to blade tips 2213.

Figure 6B:
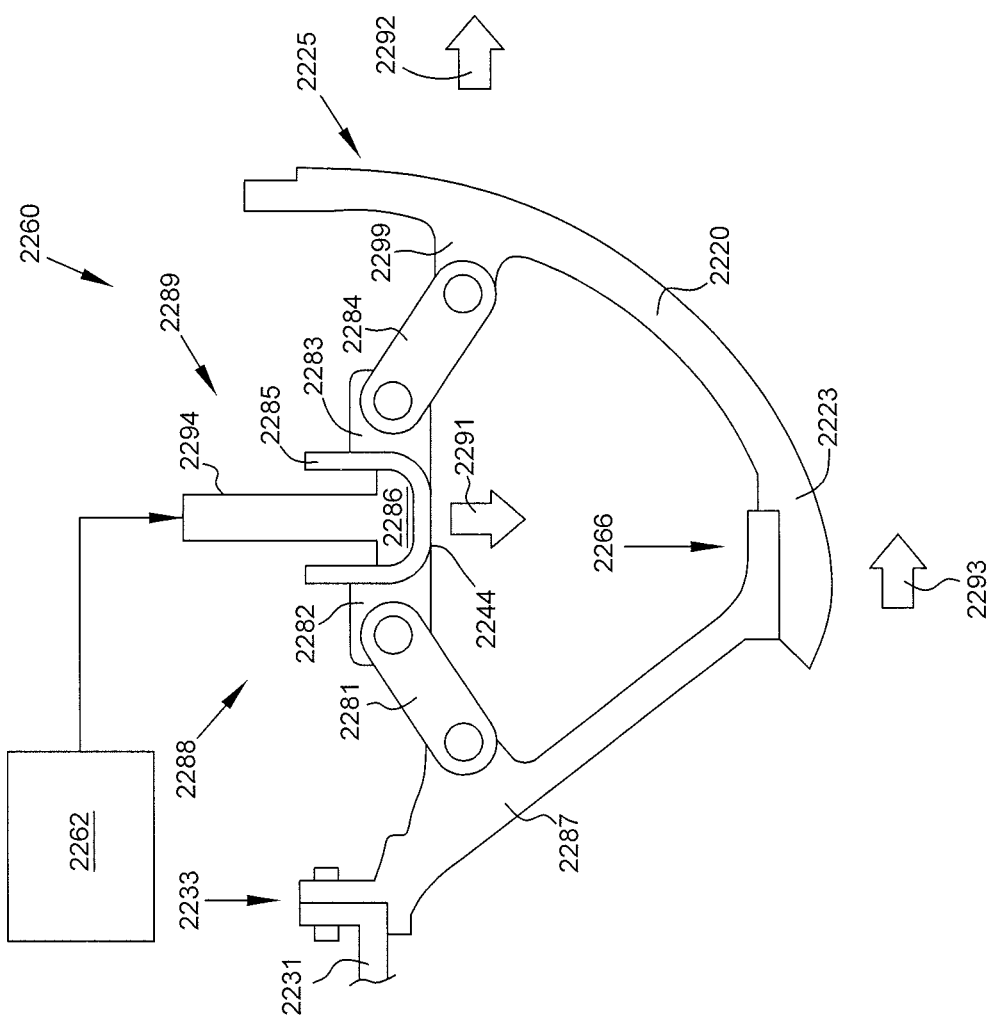
FIG. 6B is an enlarged schematic and sectional view of the clearance control system illustrated in FIG. 6A, in accordance with some embodiments of the present disclosure.

FIG. 6B is an enlarged schematic and sectional view of the clearance control system 2260 illustrated in FIG. 6A, in accordance with some embodiments of the present disclosure. The operation of clearance control system 2260 will be discussed with reference to FIG. 6B.

In some embodiments during operation of centrifugal compressor 2210 blade tip clearance 2240 is monitored by periodic or continuous measurement of the distance between surface 2222 and blade tips 2213 using a sensor or sensors positioned at selected points along the length of surface 2222. When clearance 2240 is larger than a predetermined threshold, it may be desirable to reduce the clearance 2240 to prevent leakage and thus improve centrifugal compressor efficiency. Actuating temperature of thermal driver 2286 may be adjusted based on the measured blade tip clearance 2240.

In other embodiments, engine testing may be performed to determine blade tip clearance 2240 for various operating parameters and a piston chamber 2274 pressure schedule is developed for different modes of operation. For example, based on clearance 2240 testing, piston chamber 2274 pressures may be predetermined for cold engine start-up, warm engine start-up, steady state operation, and max power operation conditions. As another example, a table may be created based on blade tip clearance 2240 testing, and piston chamber 2274 pressure is adjusted according to operating temperatures and pressures of the centrifugal compressor 2210. Thus, based on monitoring the operating conditions of the centrifugal compressor 2210 such as inlet pressure, discharge pressure, and/or working fluid temperature, a desired blade tip clearance 2240 is achieved according to a predetermined schedule of pressures for piston chamber 2274.

Regardless of whether clearance 2240 is actively monitored or controlled via a schedule, in some operating conditions it may be desirable to reduce the clearance 2240 in order to reduce leakage past the centrifugal compressor 2210. In order to reduce the clearance 2240, relatively cool air is supplied from air source 2262 to thermal driver cavity 2286 via thermal feed air tube 2294. As relatively cool air fills the annular thermal driver cavity 2286 it causes contraction of annular ring 2285. This contraction reduces the circumference of the ring 2285, such that radially inner surface 2244 moves in a radially inward direction as indicated by arrow 2291.

Forward translator 2282 and aft translator 2283 are coupled to ring 2285 and therefore also move in a radially inward direction. This radially inward motion causes an elongation of linkage assembly 2288, as forward linkage 2281 and aft linkage 2284 are pushed by forward translator 2282 and aft translator 2283, respectively, in a radially inward direction. The pin joints created by pins 2296A, 2296B, 2296C, and 2296D cause this radially inward motion to be translated to axial motion.

With forward linkage 2281 coupled to forward casing arm 2287, which is in turn rigidly coupled, or "grounded", to casing 2231 via mounting flange 2233, motion in the axially forward direction is prohibited. Thus, linkage assembly 2288 translates the radially inward motion of ring 2285 into an axially aft motion.

Aft linkage 2284 acts on axial protrusion 2300, causing aft end portion 2225 of shroud 2220 to move in an axially aft direction as indicated by arrow 2292. This movement of aft end portion 2225 is translated to a similar axially aft movement at the sliding joint 2266, where forward end portion 2223 is displaced in an axially aft direction relative to forward casing arm 2287 as indicated by arrow 2293. In other words, expansion and contraction of annular ring 2285 results in axial movement of shroud 2220 while substantially maintaining a radial alignment.

The axially aft movement of shroud 2220 caused by ring 2285 contraction results in shroud 2220 moving closer to blade tips 2213, thus reducing the clearance 2240 and leakage. During many operating conditions this deflection of shroud 2220 in the direction of blade tips 2213 is desirable to reduce leakage and increase compressor efficiency.

Where monitoring of blade tip clearance 2240 indicates the need for an increase in the clearance 2240, the process described above is reversed. Relatively warmer air is supplied from air source 2262 to thermal driver cavity 2286, causing expansion of ring 2285. This expansion results in a radially outward movement of ring 2285, forward translator 2282, and aft translator 2283, which is in turn translated to an axially forward motion by linkage assembly 2288. Aft end portion 2225 is pulled by linkage assembly 2288 in an axially forward direction, and shroud 2220 moves in an axially forward direction accordingly. Sliding displacement at sliding joint 2266 allows forward end portion 2223 to move axially forward relative to forward casing arm 2287. Thus, by applying relatively warmer air to thermal driver cavity 2286, shroud 2220 is moved axially forward away from blade tips 2213, increasing blade tip clearance 2240. Slidable coupling 2266 is dimensioned such that an air boundary is maintained through the full range of axial movement of shroud 2220.

Figure 7:
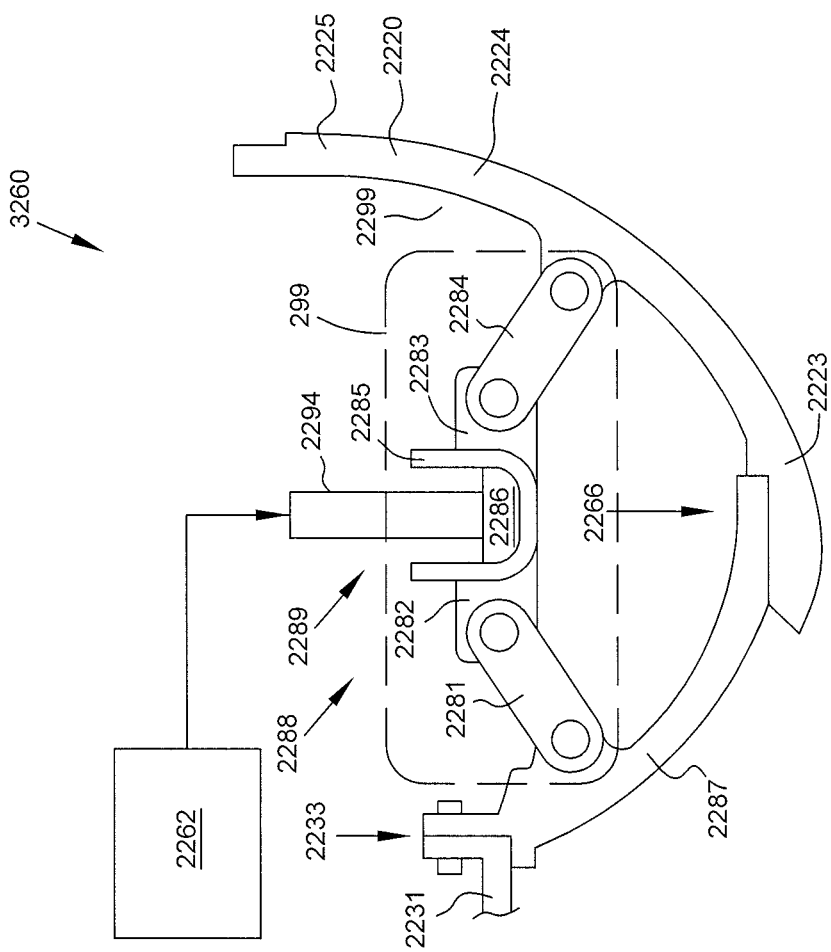
FIG. 7 is a schematic and sectional view of another embodiment of a clearance control system in accordance with the present disclosure.

FIG. 7 is a schematic and sectional view of another embodiment of a clearance control system 2360 in accordance with the present disclosure. In the embodiment of FIG. 7, axial protrusion 2300 extends from shroud 2220 at central portion 224 as opposed to aft end portion 2225.

In some embodiments central portion 2224 is defined as the centermost third of shroud 2220. In other embodiments central portion 2224 is defined as the centermost quarter of shroud 2220. In still further embodiments central portion 2224 is defined as the centermost tenth of shroud 2220. In embodiments wherein axial protrusion 2300 extends axially forward from central portion 2224, these various definitions of central portion 2224 as either the centermost third, quarter, or tenth of shroud 2220 provide for the various radial placements of axial protrusion 2300 relative to shroud 2220.

Although the embodiment of FIG. 7 operates in substantially the same manner as the clearance control system 2260 of FIGS. 6A and 6B, as described above, it should be noted that in the embodiment of FIG. 7 the shroud 2220 is subject to less flexion force due to the central placement of axial protrusion 2300 and its connection to linkage assembly 2288. In other words, moving the axial protrusion 2300 more centrally vice at the aft end portion 2225 results in axially aft directional force being applied at central portion 2224 and less flexing of the shroud 2220.

Figure 8:
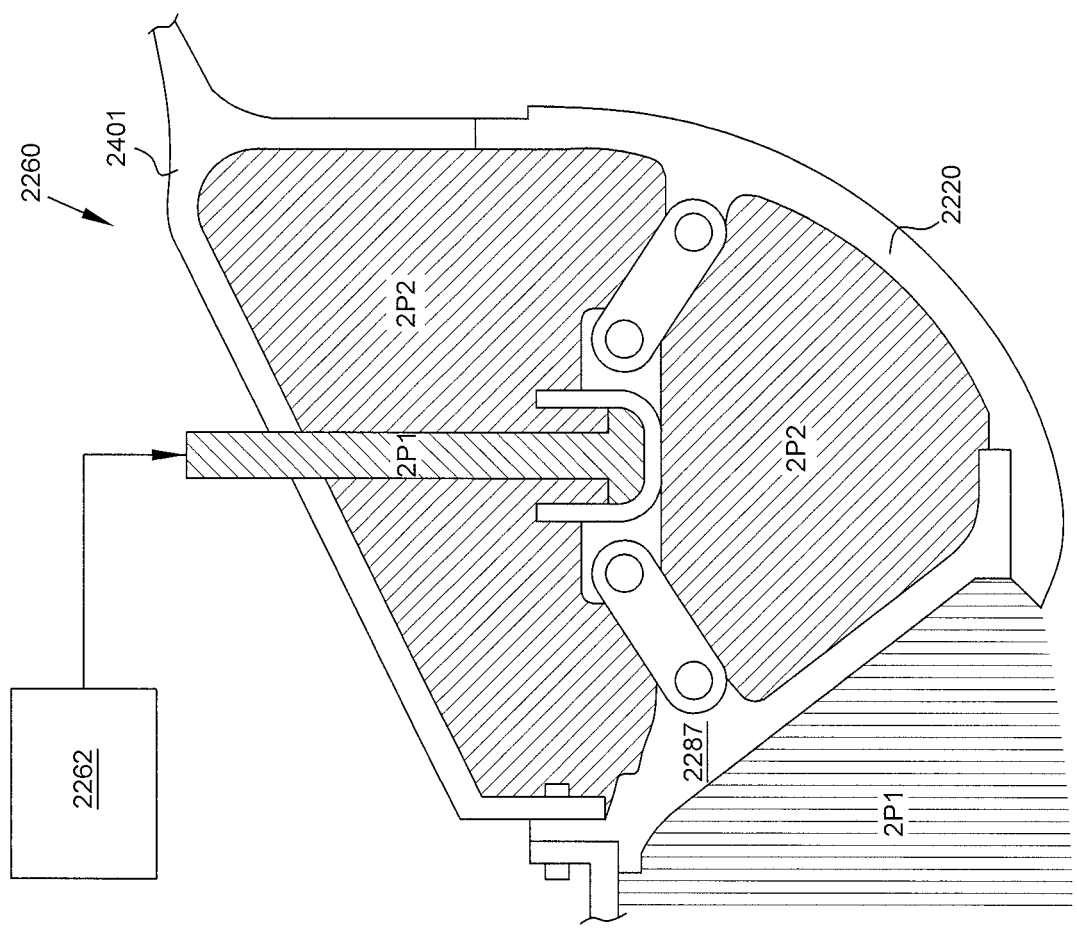
FIG. 8 is a schematic and sectional view of the pressure regions of a clearance control system in accordance with some embodiments of the present disclosure.

FIG. 8 is a schematic and sectional view of the pressure regions P1, P2, and P3 of a clearance control system 2260 in accordance with some embodiments of the present disclosure. A first pressure region P1 is defined as thermal driver cavity 2286 and the interior of thermal feed air tube 2294. A second pressure region P2 is defined between shroud 2220, forward casing arm 2287, and outward casing member 2401. A third pressure region P3 is disposed axially forward of forward casing arm 2287.

In some embodiments, second pressure region P2 is maintained at or near atmospheric pressure, meaning that region P2 is neither sealed nor pressurized. However, relatively low pressures in region P2 creates a large differential pressure across shroud 2220 (i.e. differential pressure between the pressure of region P2 and the pressure of the centrifugal compressor 2210) such that it is more difficult to deflect or cause axial movement in shroud 2220.

In other embodiments second pressure region P2 is sealed and pressurized to reduce the differential pressure across the shroud 2220. For example, in some embodiments second pressure region P2 is pressurized using one of inducer air, exducer air, intermediate stage compressor air, or discharge air from the centrifugal compressor 2210. The force required to move shroud 2220 is greatly reduced due to the lower differential pressure across the shroud 2220.

In some embodiments third pressure region P3 is pressurized with inducer air and is therefore at a lower pressure than second pressure region P2.

Figure 9:
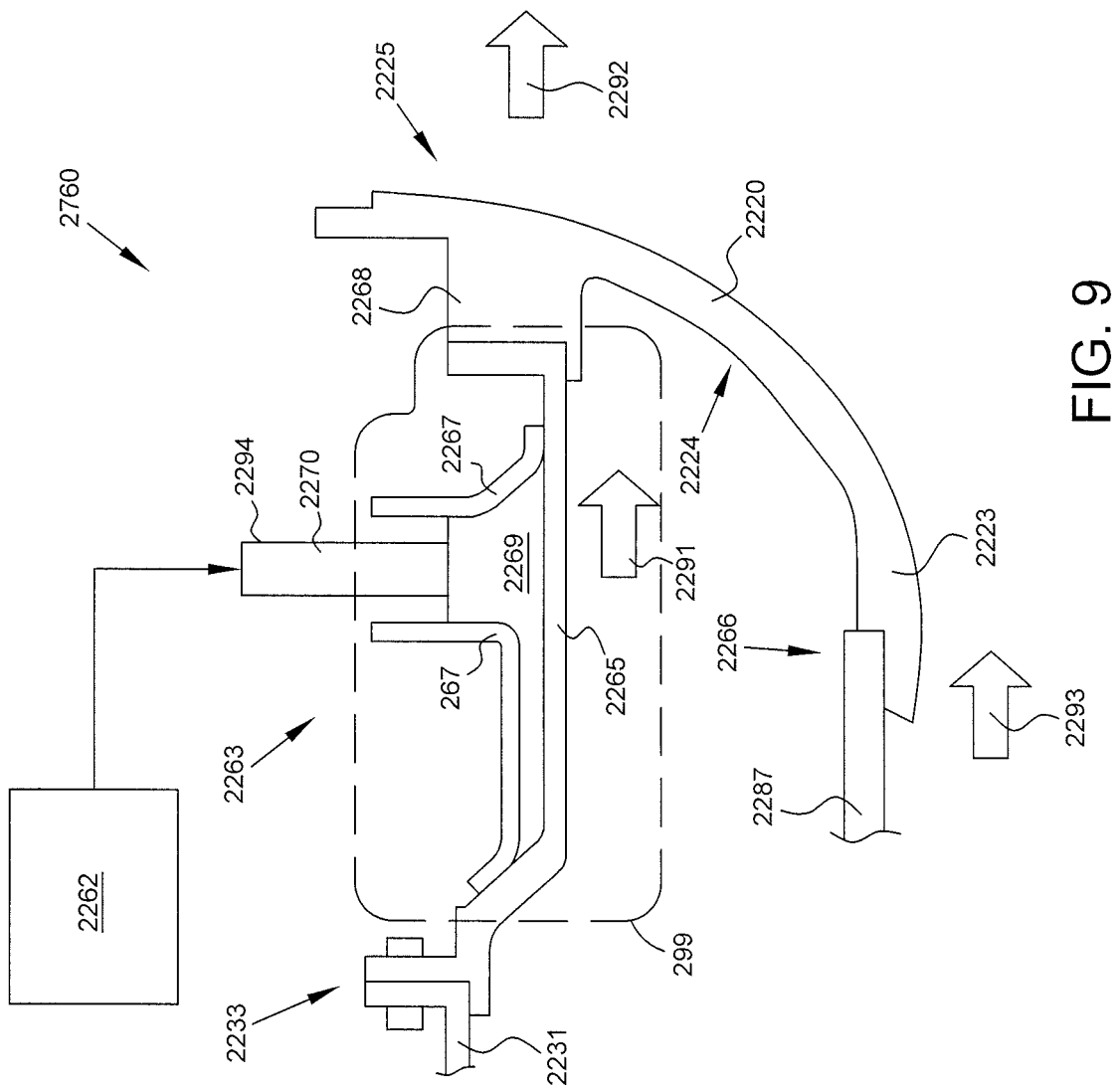
FIG. 9 is a schematic and sectional view of another embodiment of a clearance control system in accordance with the present disclosure.

FIG. 9 is a schematic and sectional view of another embodiment of a clearance control system 2760 in accordance with the present disclosure. Clearance control system 2760 comprises an air source 2262, a thermal drive assembly 2263, and an annular shroud 2220.

Air source 2262 and annular shroud 2220 are substantially the same, and operates in substantially the same manner, as discussed above with reference to FIGS. 6A and 6B.

Thermal drive assembly 2263 comprises an annular thermal drive ring 2265, a drive ring sleeve 2267, and thermal feed air tube 2294. Thermal drive ring 2265 is coupled between a portion of the engine casing 2231 at mounting flange 2233 and a mount platform 268 extending axially forward from the aft end portion 2225 of shroud 2220. Thermal drive ring 2265 is formed from a thermally-responsive material such that excitement by application of relatively cool or relatively warm air causes contraction or expansion, respectively. Thermal drive ring 2265 is sized to meet the actuation needs of clearance control system 2760.

Drive ring sleeve 2267 is coupled to thermal drive ring 2265 to form an annular cavity 2269. This cavity 2269 is in fluid communication with the interior 2270 of at least one thermal feed air tube 2294. In some embodiments, more than one thermal feed air tube 2294 are disposed circumferentially around the thermal drive ring 2265 and fluidly communicate with the annular cavity 2269.

Regardless of whether clearance 2240 is actively monitored or controlled via a schedule, in some operating conditions it will be desirable to reduce the clearance 2240 in order to reduce leakage past the centrifugal compressor 2210. In order to reduce the clearance 2240, relatively warm air is supplied from air source 2262 to annular cavity 269 via thermal feed air tube 2294. As relatively warm air fills the annular cavity 2269 it causes expansion, primarily in the axial direction, of thermal drive ring 2265. This axial expansion is anchored, or "grounded", against the engine casing 2231 such that axial expansion or movement is prohibited in the axially forward direction. Thus, the axial expansion of thermal drive ring 2265 acts in the axially aft direction as illustrated by arrow 2291, imparting a force on the mount platform 2268 and thus on the aft end portion 2225 of shroud 2220 as illustrated by arrow 2292. This movement of aft end portion 2225 is translated to a similar axially aft movement at the sliding joint 2266, where forward end portion 2223 is displaced in an axially aft direction relative to forward casing arm 2287 as indicated by arrow 2293.

The axially aft movement of shroud 2220 caused by expansion of ring 2265 results in shroud 2220 moving closer to blade tips 2213, thus reducing the clearance 2240 and leakage. During many operating conditions this deflection of shroud 2220 in the direction of blade tips 2213 is desirable to reduce leakage and increase compressor efficiency.

Where monitoring of blade tip clearance 2240 indicates the need for an increase in the clearance 2240, the process described above is reversed. Relatively cooler air is supplied from air source 2262 to annular cavity 2269, causing contraction of ring 2265. This contraction is primarily in the axial direction and results in the axially forward movement of ring 2265 and mount platform 2268. Aft end portion 2225 is pulled in an axially forward direction, and shroud 2220 moves in an axially forward direction accordingly. Sliding displacement at sliding joint 2266 allows forward end portion 2223 to move axially forward relative to forward casing arm 2287. Thus, by applying relatively cooler air to annular cavity 2269, shroud 2220 is moved axially forward away from blade tips 2213, increasing blade tip clearance 2240.

In some embodiments alternative clearance control system 2760 has a modified placement of the linkage assembly to shroud connection, similar to the embodiment disclosed with reference to FIG. 7 above.

Figure 10:
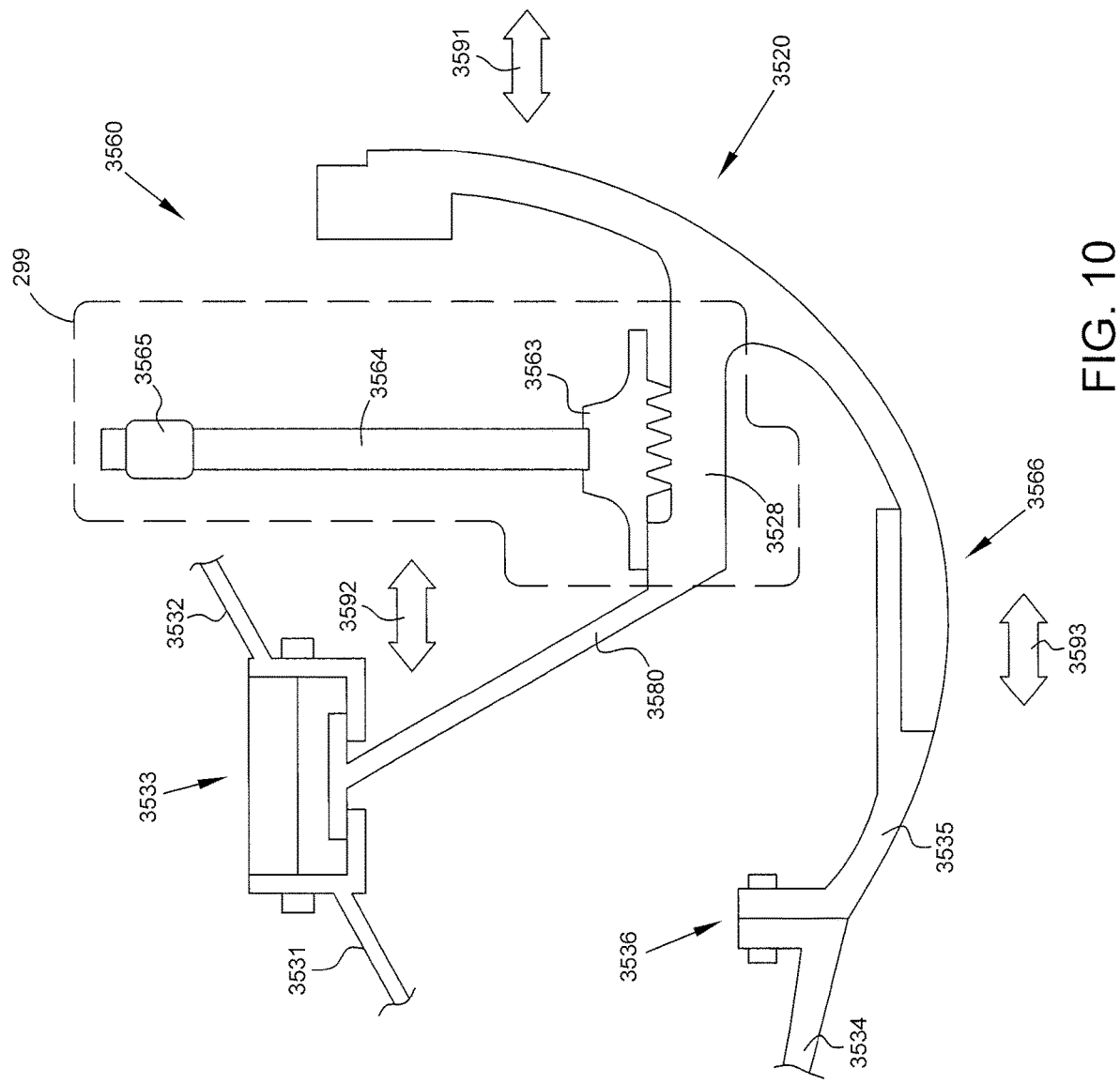
FIG. 10 is a schematic and sectional view a clearance control system in accordance with some embodiments of the present disclosure.

The present disclosure is further directed to a system which translates a pivoting motion of a driving mechanism into axial motion of an impeller shroud to control clearance in a centrifugal compressor. FIG. 10 is a schematic and sectional view of another embodiment of a clearance control system 3560 in accordance with the present disclosure.

Clearance control system 3560 comprises a shroud 3520 threadably coupled to at least one actuator 299 and slidably coupled to at least a portion of a casing 3531, 3532, 3535. In some embodiments shroud 3520 is segregated, while in other embodiments shroud 3520 may be a unitary or non-segregated component as illustrated in FIG. 10. Actuator 299 comprises a threaded member 3563 and driving member 3564 which is coupled to an actuator ring 3565. Driving member 3564 extends along a radius of and is rotatable about the axis of rotation of the centrifugal compressor (not shown in FIG. 10). Driving member 3564 is coupled to threaded member 3563 which comprises a plurality of driving threads adapted to rotate with said driving member 3564 while maintaining an axial alignment. Actuator ring 3565 is coupled to a driving mechanism.

Shroud 3520 is carried by various portions of the casing. Shroud 3520 is threadably coupled at a threaded portion 3528 to threaded member 3563. Threaded portion 3528 comprises a plurality of driven threads. Shroud 3520 is coupled to a casing arm 3280 which is slidably coupled to casing 3531 and 3532 at slidable junction 3533. Shroud is also slidably coupled axial casing member 3535 at slidable coupling 3566. Axial casing member 3535 is coupled at flange 3536 to casing portion 3534.

When actuator ring 3565 is moved about the axis of the impeller shaft (not shown) (i.e. into or out of the page), driving member 3564 is moved about the axis of the impeller shaft as well. The motion of driving member 3564 is translated by threaded member 3263 as motion in an axially forward or axially aft direction. Shroud 3520 moves axially forward or axially aft, with slidable coupling 3566 allowing axial motion relative to axial casing member 3535 and slidable junction 3533 allowing axial motion relative to casing 3531, 3532. The motion of shroud 3520 is illustrated using arrows 3591, 3592, and 3593. In other words, the motion of driving member 3564 about the axis the impeller shaft results in axial movement of shroud 3520 while substantially maintaining a radial alignment.

Figure 11:
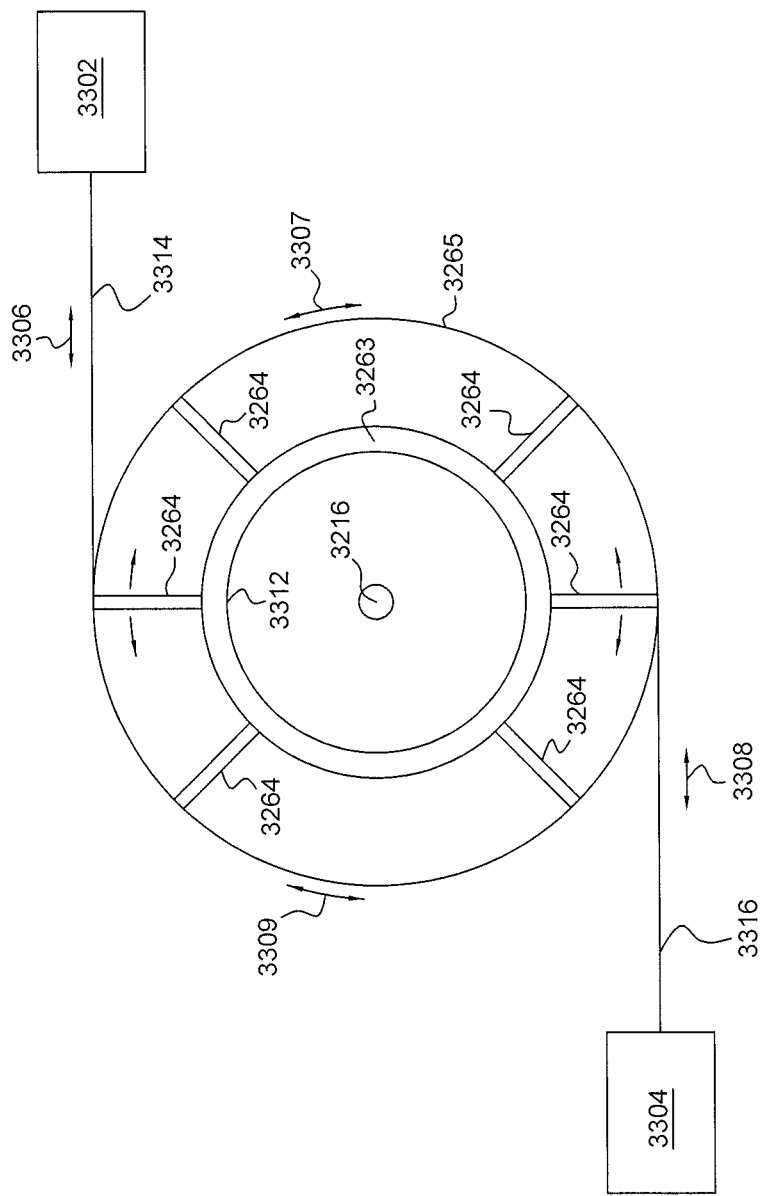
FIG. 11 is a schematic and axial view of a plurality of driver arms circumferentially disposed about an impeller shroud in accordance with some embodiments of the present disclosure.

FIG. 11 is a schematic and axial view of a plurality of driving members 3564 circumferentially disposed about an impeller shroud 3520 (not shown) in accordance with some embodiments of the present disclosure. A first driving mechanism 3302 and second driving mechanism 3304 are coupled via a first connector 3314 and second connector 3316, respectively, to actuator ring 3565. Driving mechanisms 3302, 3304 cause motion of actuator ring 3565 about an axis parallel to the axis A of shaft 3216 or about the axis A of shaft 3216 as indicated by arrows 3307 and 3309 by moving connectors 3314, 3316 as indicated by arrows 3306, 3308.

In some embodiments, more or fewer driving mechanisms are used to impart motion to actuator ring 3565. For example in some embodiments each of the plurality of driving members 3564 may have an individual driving mechanism. In some embodiments, first driving mechanism 3302 and second driving mechanism 3304 may be one of electrical, pneumatic, or hydraulic actuators.

FIG. 11 illustrates a plurality of driving arms 3564 coupled to a single annular threaded axial member 3563. In some embodiments, a plurality of discrete threaded axial members 3563 are disposed about an annular ring 3312 formed by threaded portion 3528 and the axially-extending portion of casing arm 3580. In some embodiments, threaded portion 3528 may be a continuous annular component; in other embodiments, threaded portion 3528 may be a plurality of limited, discrete components.

In the illustrated embodiment, the six driving arms 3564 are coupled to a single actuator ring 3565. In other embodiments, more or fewer driving arms 3564 may be used. For example, in one embodiment of the present disclosure first driving mechanism 3302 is coupled to a single driving arm 3564 and second driving mechanism 3304 is coupled to a different single driving arm 3564.

In some embodiments, actuator ring 3565 is divided into several portions such that a driving mechanism 3302, 3304 controls only a portion of the driving arms 3564. For example, in some embodiments actuator ring 3565 is divided in half such that first driving mechanism 3302 controls half of the driving arms 3564 and second driving mechanism 3304 controls the other half of the driving arms 3564.

Figure 12A:
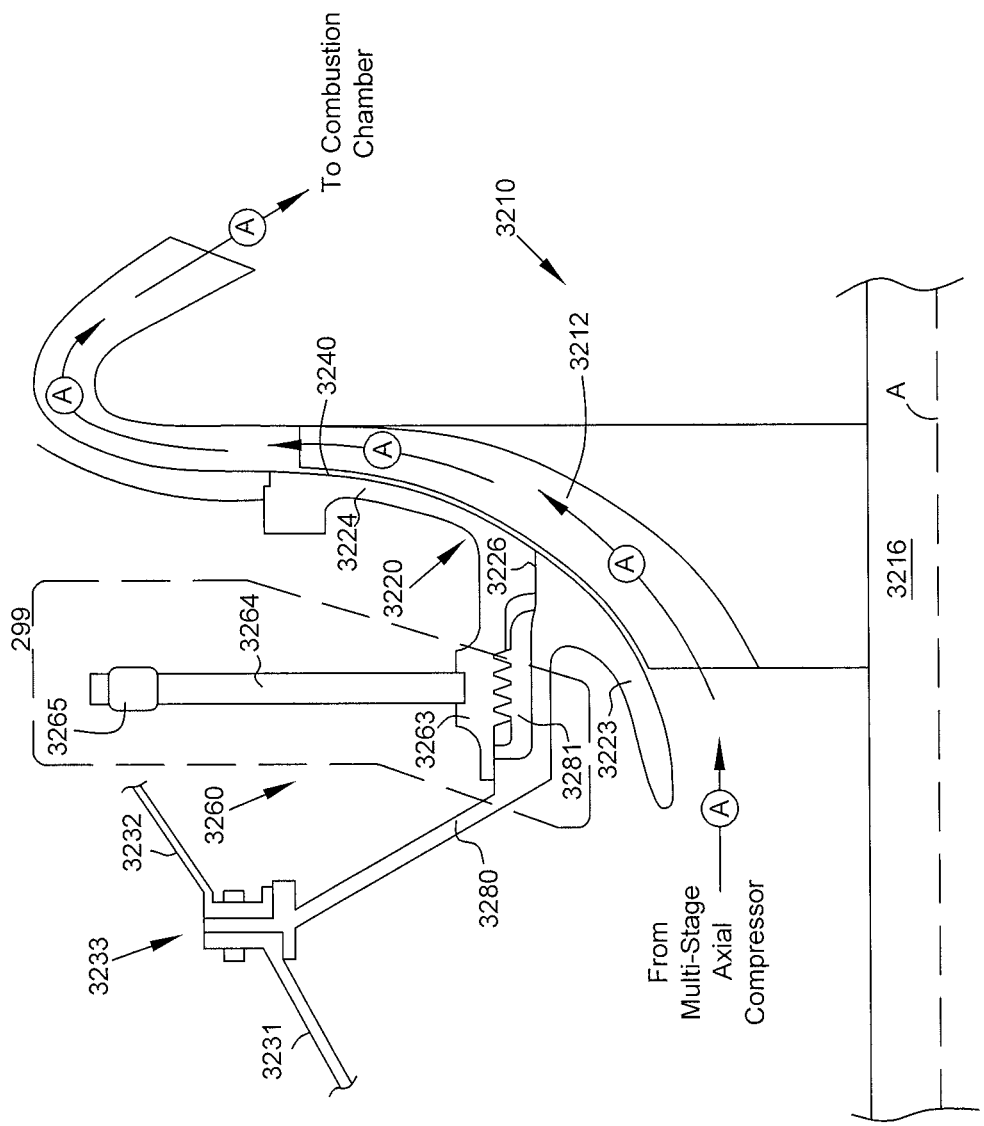
FIG. 12A is a schematic and sectional view of a centrifugal compressor system having a clearance control system is accordance with some embodiments of the present disclosure.
Figure 12B:
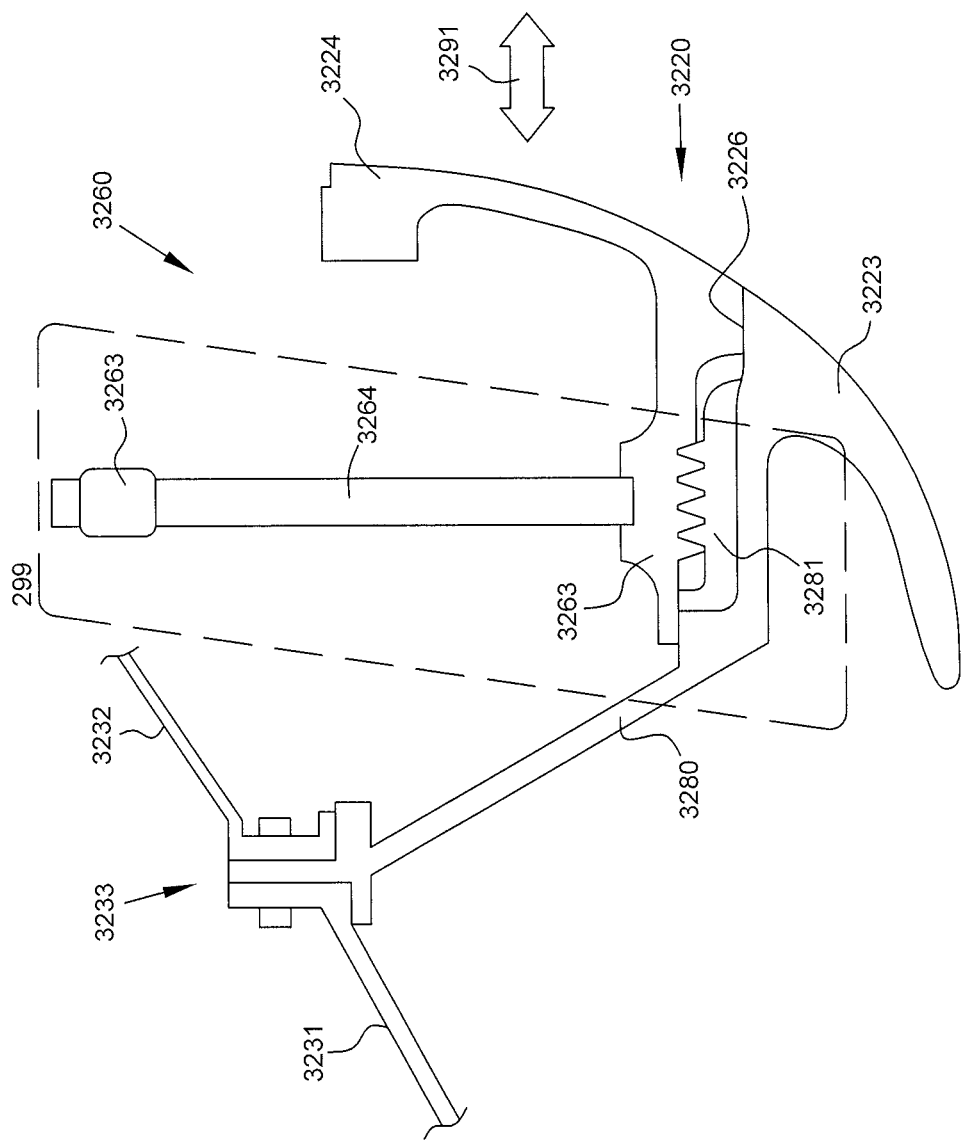
FIG. 12B is an enlarged schematic and sectional view of the clearance control system illustrated in FIG. 12A, in accordance with some embodiments of the present disclosure.

In some embodiments, a clearance control system 3260 may comprise at least one actuator 299 and a segregated annular impeller shroud 3220 that comprises an inducer portion 3223 and exducer portion 3224. FIGS. 12A and 12B provide illustrations of such an embodiment. Clearance control system 3260 can also be referred to as a compressor shroud assembly.

As disclosed above, in some embodiments the actuator 299 may comprise a pneumatic piston, a set of thermally-actuated linkages, or a threaded member. In the illustrated embodiment of FIGS. 12A and 12B, actuator 299 may comprise a threaded axial member 3263 and driving member 3264. Threaded axial member 3263 is adapted to communicate with a threaded portion 3281 of casing arm 3280. In some embodiments threaded portion 3281 may be carried by inducer portion 3223. Driving member 3264 extends along a radius of the axis of rotation A of the rotatable centrifugal compressor 3210 and is coupled to an actuator ring 3265. The movement of actuator ring 3265 causes driving member 3264 to rotate about an axis parallel to shaft 3216, or the axis of rotation A of shaft 3216, which in turn causes threaded axial member 3263 to move in an axially forward or axially aft direction.

Shroud 3220 is partly a dynamically moveable impeller shroud. Segregated annular impeller shroud 3220 encases the plurality of blades 3212 of the centrifugal compressor 3210. Shroud 3220 comprises a fixed inducer portion 3223 and a moveable exducer portion 3224.

In some embodiments, inducer portion 3223 is formed as a unitary structure with casing arm 3280; in other embodiments, inducer portion 3223 is formed separate from and coupled to casing arm 3280.

In some embodiments, exducer portion 3224 may be formed as a unitary structure with threaded axial member 3263; in other embodiments, exducer portion 3224 may be formed separate from and coupled to threaded axial member 3263. Exducer portion 3224 further comprises a sealing surface 3226 which abuts inducer portion 3223. In some embodiments additional sealing components are utilized to ensure proper sealing between sealing surface 3226 and inducer portion 3223.

Clearance control system 3260 is coupled to the engine casing via casing arm 3280, which is joined to a first casing portion 3231 and second casing portion 3232 at a first mounting flange 3233. In some embodiments first casing portion 3231 is at least a portion of a casing around the multi-stage axial compressor.

In order to reduce the clearance 3240, a driving mechanism 3302 (discussed above with reference to FIG. 11) imparts motion to actuator ring 3265. In FIGS. 12A and 12B, the motion of actuator ring 3265 is into or out of the page about an axis parallel to the axis A of shaft 3216 or about the axis A of shaft 3216. This motion of actuator ring 3265 results in motion of driving member 3264 about an axis parallel to the axis A of shaft 3216 or about the axis A of shaft 3216. The motion of driving member 3264 is translated by threaded axial member 3263 as motion in an axially forward or axially aft direction. With threaded portion 3281 rigidly coupled, or "grounded", to casing 3231 via casing arm 3280, axial motion is transferred to the exducer portion 3225 of shroud 3220 as indicated by arrow 3291. In some embodiments, exducer portion 3225 rotates with driving member 3264 as it translates axially forward or axially aft.

The present disclosure provides many advantages over previous systems and methods of controlling blade tip clearances. The disclosed clearance control systems allow for tightly controlling blade tip clearances, which are a key driver of overall compressor efficiency. Improved compressor efficiency results in lower fuel consumption of the engine. Additionally, the present disclosure eliminates the use of complicated linkages, significant weight penalties, and/or significant power requirements of prior art systems.

In embodiments having an air piston as an actuator, utilizing compressor discharge as the high pressure gas source obviates the need to attach an actuator external to the compressor or engine. The use of an air piston provides for manufacturing the shroud from a rigid or primarily rigid material, with the piston chamber supplying axial deflection of the shroud.

In embodiments having a thermal actuator, the use of thermal gradients in the engine as an actuator for the impeller shroud additionally eliminates the need for an actuator external to the engine.

Although examples are illustrated and described herein, embodiments are nevertheless not limited to the details shown, since various modifications and structural changes may be made therein by those of ordinary skill within the scope and range of equivalents of the claims.

What is claimed is:

1. A compressor shroud assembly in a turbine engine, the compressor shroud assembly comprising:
   a static compressor casing;
   an impeller shroud arranged circumferentially around an axis for encasing a rotatable centrifugal compressor, the impeller shroud extending axially from an aft end to a forward end relative to the axis; and
   an actuator mounted between the static compressor casing and the impeller shroud, the actuator having an aft-extending arm coupled to the impeller shroud proximate the aft end of the impeller shroud and an air piston coupled with the aft-extending arm, the air piston including a first U-shaped ring that extends radially outward relative to the aft-extending arm and a second U-shaped ring that extends radially inward relative to the aft-extending arm opposite the first U-shaped ring to define at least a portion of a piston chamber radially between the first U-shaped ring and the second U-shaped ring, and the air piston configured to receive a first pressurized air within the piston chamber to cause the first U-shaped ring and the second U-shaped ring to flex and move the aft-extending arm axially, wherein the impeller shroud moves relative to the rotatable centrifugal compressor in an axial direction when the actuator is actuated.

2. The compressor shroud assembly of claim 1, further comprising a first chamber bounded in part by the static compressor casing, the actuator, and at least a portion of the impeller shroud proximate the aft end thereof, the first chamber configured to be pressurized by a second pressurized air independent of the piston chamber being pressurized by the first pressurized air.

3. The compressor shroud assembly of claim 2, further comprising a second chamber bounded in part by the static compressor casing, the actuator, and at least a portion of said impeller shroud proximate the forward end thereof, the second chamber configured to be pressurized by a third pressurized air independent of the piston chamber being pressurized by the first pressurized air.

4. The compressor shroud assembly of claim 1, wherein the actuator further includes a forward rigid member mounted at a forward end to the static compressor casing, an aft rigid member coupled to an aft end of the aft-extending arm, and a flexible member that extends between and interconnects the forward and aft rigid members to thereby form the piston chamber, the flexible member including the first U-shaped ring and the second U-shaped ring.

5. The compressor shroud assembly of claim 1, wherein the air piston is an annular piston.

6. The compressor shroud assembly of claim 1, wherein the air piston is included in a plurality of discrete air pistons arranged circumferentially about the axis.

7. The compressor shroud assembly of claim 1, wherein the actuator further includes a high pressure air source fluidly coupled to the piston chamber of the air piston through a receiving chamber, the receiving chamber including a regulating valve configured to control the flow of the first pressurized air from the high pressure air source into and out of the piston chamber.

8. The compressor shroud assembly of claim 1, wherein the impeller shroud is coupled at the forward end to the static compressor casing by a slidable coupling that maintains an air boundary during the full range of axial movement of said impeller shroud.

9. A compressor shroud assembly in a turbine engine, the compressor shroud assembly comprising:
a static compressor casing arranged circumferentially about an axis;
an actuator mounted to the static compressor casing, the actuator including a first arm, an air piston, and a second arm, the first arm extends from the air piston and is coupled with the static compressor casing, the air piston defines a piston chamber therein and is configured to expand and contract in response to pressurized air being directed into and out of the piston chamber, and the second arm extends axially from the air piston and is configured to move in an axial direction while maintaining a radial alignment relative to the axis when the air piston expands and contracts; and
an impeller shroud for encasing a rotatable centrifugal compressor, the impeller shroud coupled to the second arm proximate an axially aft end of the impeller shroud, wherein the impeller shroud moves relative to the rotatable centrifugal compressor in the axial direction when the actuator is actuated,
wherein the entire air piston and the entire piston chamber defined therein are spaced apart from the impeller shroud.

10. The compressor shroud assembly of claim 9, wherein the actuator further includes a first rigid member mounted at a first end to the static compressor casing, a second rigid member coupled at a second end to the second arm, and a flexible member that extends between and interconnects the first and second rigid members to form the piston chamber.

11. The compressor shroud assembly of claim 10, wherein the flexible member comprises a first hoop having a U-shaped cross-section that extends radially outward from the first rigid member and a second hoop having a U-shaped cross-section that extends radially inward from the first rigid member.

12. The compressor shroud assembly of claim 9, wherein the first arm extends axially aft and radially outward from the air piston to the static compressor casing to couple the actuator to the static compressor casing.

13. The compressor shroud assembly of claim 12, wherein the air piston includes a first rigid member mounted at a first end to the first arm, a second rigid member coupled at a second end to the second arm, and a flexible member that extends between and interconnects the first and second rigid members.

14. The compressor shroud assembly of claim 13, wherein the flexible member comprises a hoop having a U-shaped cross-section that extends radially outward from the first rigid member.

15. The compressor shroud assembly of claim 9, wherein the impeller shroud is coupled at a forward end to the static compressor casing by a slidable coupling that maintains an air boundary during the full range of axial movement of said impeller shroud.

16. The compressor shroud assembly of claim 9, further comprising a chamber bounded in part by the static compressor casing and at least a portion of the impeller shroud proximate the aft end thereof, the chamber being pressurized independent of the piston chamber.

17. A compressor shroud assembly in a turbine engine, the compressor shroud assembly comprising:
a static compressor casing arranged circumferentially about an axis;
an impeller shroud arranged circumferentially around the axis and configured to encase a rotatable centrifugal compressor;
an actuator coupled with the static compressor casing and the impeller shroud and configured to expand and contract to move the impeller shroud relative to the rotatable centrifugal compressor to control a blade tip clearance between the impeller shroud and the rotatable centrifugal compressor, the actuator including an air piston formed to define a piston chamber enclosed within the air piston, the air piston configured to expand and contract in response to pressurized air being directed into and out of the piston chamber to cause the air piston to move the impeller shroud, and the air piston and the piston chamber defined therein are spaced apart from the impeller shroud.

18. The compressor shroud assembly of claim 17, wherein the air piston includes a rigid forward member, a rigid aft member, and a central member disposed between the forward member and the aft member, wherein the forward member, the central member, and the aft member cooperate to define the piston chamber within the forward member, the central member, and the aft member, and wherein the central member is configured to flex to allow the air piston to expand and contract in response to the pressurized air being directed into and out of the piston chamber.

19. The compressor shroud assembly of claim 18, wherein the central member includes a first U-shaped ring that interconnects and extends radially away from both the forward member and the aft member and a second U-shaped ring that interconnects and extends radially inward from both the forward member and the aft member.

20. The compressor shroud assembly of claim 17, wherein the impeller shroud forms no portion of the piston chamber.

* * * * *